United States Patent [19]
Ofek

[11] Patent Number: 6,101,497
[45] Date of Patent: *Aug. 8, 2000

[54] METHOD AND APPARATUS FOR INDEPENDENT AND SIMULTANEOUS ACCESS TO A COMMON DATA SET

[75] Inventor: Yuval Ofek, Framingham, Mass.

[73] Assignee: EMC Corporation, Hopkinton, Mass.

[*] Notice: This patent is subject to a terminal disclaimer.

[21] Appl. No.: 08/842,953

[22] Filed: Apr. 25, 1997

Related U.S. Application Data

[63] Continuation-in-part of application No. 08/656,035, May 31, 1996.

[51] Int. Cl.⁷ .................................................. G06F 17/30
[52] U.S. Cl. ............................................ 707/10; 707/204
[58] Field of Search .............................. 707/8, 201, 202, 707/204, 200, 10; 395/182.04, 182.13

[56] References Cited

U.S. PATENT DOCUMENTS

| | | | |
|---|---|---|---|
| 4,866,611 | 9/1989 | Cree et al. | 364/705.08 |
| 4,975,690 | 12/1990 | Torres | 340/721 |
| 5,093,787 | 3/1992 | Simmons | 705/33 |
| 5,392,390 | 2/1995 | Crozier | 345/335 |
| 5,432,922 | 7/1995 | Polyzois et al. | 395/182.04 |
| 5,434,994 | 7/1995 | Shaheen et al. | 707/201 |
| 5,469,503 | 11/1995 | Butensky et al. | 379/265 |
| 5,479,615 | 12/1995 | Ishii et al. | 395/250 |
| 5,495,606 | 2/1996 | Borden et al. | 395/600 |
| 5,504,888 | 4/1996 | Iwamoto et al. | 395/600 |
| 5,579,318 | 11/1996 | Reuss et al. | 370/410 |
| 5,592,660 | 1/1997 | Yokota et al. | 395/608 |
| 5,596,706 | 1/1997 | Shimazaki et al. | 395/182.04 |
| 5,596,745 | 1/1997 | Lai et al. | 395/614 |
| 5,603,024 | 2/1997 | Goldring | 395/619 |
| 5,615,364 | 3/1997 | Marks | 707/202 |
| 5,625,818 | 4/1997 | Zarmer et al. | 707/104 |
| 5,649,089 | 7/1997 | Kilner | 395/182.04 |

FOREIGN PATENT DOCUMENTS

0593062A3  10/1993  European Pat. Off.  ........ G06F 11/00

*Primary Examiner*—Maria N. Vonbuhr
*Attorney, Agent, or Firm*—George A. Herbster; Pearson & Pearson

[57] ABSTRACT

A data network with data storage facilities for providing redundant data storage and for enabling concurrent access to the data for multiple purposes. A first data processing system with a first data facility stores a data base and processes transactions or other priority applications. A second data storage facility, that may be physically separated from the first data storage facility, mirrors the data in the first data storage facility. In a concurrent access operating mode, the second data storage facility makes the data available to an application concurrently with, but independently of, the operation of the other application. On completion of the concurrent operation, the second data storage facility can reconnect with and synchronizes with the first data storage facility thereby to reestablish the mirroring operation.

10 Claims, 19 Drawing Sheets

| FIRST VECTOR | | SECOND VECTOR | | THIRD VECTOR | | RESULT | |
|---|---|---|---|---|---|---|---|
| M1 | M2 | M1 | M2 | M1 | M2 | M1 | M2 |
| 0 | 0 | 0 | 0 | 0 | 0 | 0 | 0 |
| 0 | 0 | 1 | 0 | 0 | 1 | 0 | 1 |
| 0 | 1 | 0 | 0 | 0 | 0 | 0 | 1 |
| 0 | 1 | 1 | 0 | 0 | 1 | 0 | 1 |

FIG. 7

METHOD AND APPARATUS FOR INDEPENDENT AND SIMULTANEOUS ACCESS TO A COMMON DATA SET

CROSS REFERENCE TO A RELATED APPLICATION

This is a continuation-in-part of copending application for U.S. Pat. Ser. No. 08/656,035 filed May 31, 1996 for a Method and Apparatus for Independent Operation of a Remote Data Facility, which application is assigned to the same assignee as this invention.

BACKGROUND OF THE INVENTION

1. Field of the Invention

This invention generally relates to digital data processing systems adapted for simultaneous, diverse uses such as on-line transaction application or other priority processing applications and decision support system, backup and other applications that characterize data base management system operations.

2. Description of Related Art

Computer implemented data base management systems are exemplary of systems that operate with what can become two antithetical considerations, namely: (1) maintaining the integrity of the data on the system and (2) maintaining maximum availability of the data on the system. That is, in prior art systems backup operations to preserve data integrity and normal operations for using the data base were mutually exclusive operations. The considerations of data integrity and availability become antithetical when a backup operation interferes with normal operations or when normal operations, due their priority, prevent a timely backup. These conflicts become more prevalent because as the size of data bases increases the time required to complete a conventional backup operation increases. Yet it remains an ultimate goal to have continuous availability of the data base for normal operations.

The maintenance of data integrity in such systems originally involved making copies of the data on the same or other storage devices such as disk drives or on other media such as magnetic tape to provide an historical backup. Typically, however, these systems required all other operations in the data processing system to terminate while the backup was underway. More recently disk redundancy has evolved as an alternative or complement to historical backups. Generally speaking, in a redundant system two storage devices, such as disk storage devices, store data in a form that enables the data to be recovered if one storage device becomes disabled. In a basic approach, a first disk storage device stores the data and a second disk storage device stores a mirror image of that data. Whenever a transfer is made to the first disk storage device, the data transfers to the second disk storage device essentially simultaneously. Typically separate controllers and paths interconnect the two disk storage devices to the remainder of the computer system.

While mirroring provides one type of redundancy, the procedures for obtaining historical backups still involves the transfer of data to a backup medium, such as magnetic tape. As previously indicated, in the past the backup operation has excluded the operation of other applications or programs. However, several systems have been proposed for providing concurrent backups. For example, U.S. Pat. No. 5,212,784 to Sparks discloses an automated concurrent data backup system in which a Central Processing Unit (CPU) transfers data to and from storage devices through a primary controller. The primary controller connects through first and second independent buses to first and second mirrored storage devices respectively (i.e., a primary, or mirrored device and a secondary or mirroring data storage device). A backup controller and device connect to the secondary storage device through its bus. Normally the primary controller writes data to both the primary and secondary data storage devices. The CPU initiates a backup through the primary controller. In response the primary controller then writes only to the primary data storage device and enables the backup controller to take control of the second bus and transfer data from the secondary data storage device to the backup media. After a backup operation is completed, the primary controller resynchronizes the storage devices by updating any changes that occurred to the primary data storage device while the backup operation was underway. Examples are also disclosed in which the primary controller connects to three and four storage devices that enable the system to operate with redundancy by mirroring two storage devices while the backup occurs with a third storage device.

U.S. Pat. Nos. 5,241,668 and 5,241,670 to Eastridge et al. disclose different aspects of concurrent backup procedures. In both systems a request for a backup copy designates a portion of the stored data called a data set. For example, if the data storage devices contain a plurality of discrete data bases, a data set could include files associated with a corresponding data base. In a normal operation, the application is suspended to allow the generation of an address concordance for the designated data sets. Execution of the application then resumes. A resource manager is established to manage all input and output functions between the storage sub-systems and associated memory and temporary memory. The backup copy is formed on a scheduled and opportunistic basis by copying the designated data sets from the storage sub-systems and updating the address concordance in response to the copying. Application updates are processed during formation of the backup copy by buffering the updates, copying the affected uncopied designated data sets to a storage sub-system memory, updating the address concordance in response to the copying, and processing the updates. The designated data sets can also copy to the temporary storage memory if the number of designated data sets exceeds some threshold. The designated sets are also copied to an alternate memory from the storage sub-system, storage sub-system memory and temporary host memory utilizing the resource manager and the altered address concordance to create a specified order backup copy of the designated data sub-sets from the copied portions of the designated sub-sets without user intervention.

If an abnormal event occurs requiring termination of the backup, a status indication is entered into activity tables associated with the plurality of storage sub-systems and devices in response to the initiation of the backup session. If an external condition exists that requires the backup to be interrupted, the backup copy session terminates and indications within the activity tables are reviewed to determine the status of the backup if a reset notification is raised by a storage sub-system. This enables the track extents which are active for a volume associated with a particular session to be determined. A comparison is then made between the track events which are active and volume and track extents information associated with a physical session identification. If a match exists between the track extents which are active and the volume of and track extent information associated with a physical session identification, the backup session resumes. If the match does not exist, the backup terminates.

U.S. Pat. No. 5,473,776 to Nosaki et al. discloses a concurrent backup operation in a computer system having a central processing unit and a multiple memory constituted by a plurality of memory devices for on-line storing data processed by tasks of the central processing unit. A data backup memory is provided for saving data of the multiple memory. The central processing unit performs parallel processing of user tasks and a maintenance task. The user tasks include those that write currently processed data into the multiple memory. The maintenance task stops any updating of memory devices as a part of the multiple memory and saves the data to a data backup memory.

Each of the foregoing references does disclose an approach for performing backup operations concurrently with the execution of applications programs in a computer system. However, in each, the system operates in the environment of a single computer system under common control. For example, in the Sparks patent the CPU connects through a primary controller to the first and second memories and to the backup controller. The Eastridge et al. and the Nosaki et al. patent references disclose systems in which the execution of applications programs is also involved in the backup operation. Further while these references disclose systems for concurrent backup operations, they do not disclose or suggest any procedures for enabling the simultaneous processing of common data by different applications, such On Line Transaction Processing (OLTP) applications and Decision Support System (DSS) applications.

More recently the concept of redundancy has come to include remote data facilities. A computer system with a remote data facility will include a first data processing system with disk storage at as a local site facility and one or more duplicate data processing systems at one or more physically remote locations that operate as one or more mirrors of the data collection in the first system. The physical separation can be measured in any range between meters and hundreds or even thousands of kilometers. In whatever form, the remote data facility provides data integrity with respect to any system errors produced by power failures, equipment failures and the like.

Storage facilities using redundancy including remote data facilities have become repositories for large data bases that also are dynamic entities. They are subject to rapid change as for example in banking systems by bank teller and automatic teller machine (ATM) entries or by requests for passenger tickets in airline reservation systems. In many data base systems OLTP applications maintain the data base in a current state while DSS or query applications enable individuals to obtain reports based upon the contents of the data base.

In early systems the OLTP and DSS applications ran on a mutually exclusive basis. That is, no DSS applications could run while OLTP applications were being processed. Conversely no OLTP application processing could occur while the DSS applications were in use. Certain levels of data integrity were provided to assure the validity of entry data in such systems. For example, U.S. Pat. No. 5,450,577 to Lai et al. discloses a high capacity transaction system in which integrity is assured while transaction processing is underway. In this particular approach, a system receives events from an event generator and stores the raw events to disk, the raw events corresponding, for example, to different data entries for a particular record. Structural information relating events to transactions is not stored on disk. This provides data integrity during the construction of raw events to form a transaction or record to be posted to the data base.

Referring to the issue of availability, the increase in the number of transactions posted to such data bases and the need for twenty-four hour transaction processing particularly introduced by the sheer number of transactions being processed and worldwide access has lead to a ultimate goal of continuous availability for processing OLTP applications. It is no longer acceptable to interrupt the process of OLTP applications for purposes of processing DSS applications. Yet, if this requirement were strictly construed, it would never be possible to obtain queries, so the data base would, in effect, be useless. Consequently steps have been taken to maximize the availability of a system for processing OLTP or other priority applications while still permitting the processing of DSS applications on a timely basis.

U.S. Pat. No. 5,317,731 to Dias et al. discloses one approach for providing separate processes or on-line transaction application and decision support system application processing. In this patent on-line transaction and decision support system application processing are referred to as transaction and query processing respectively. Dias et al. utilize an intelligent page store for providing concurrent and consistent access by a functionally separate transaction entity and a query entity to a shared data base while maintaining a single physical copy of most of the data. The intelligent page store contains shared disk storage. An intelligent versioning mechanism allows simultaneous access by a transaction processor and a query processor. The transaction processor is presented current data while the query processor is presented a recent and consistent version of the data. In this particular approach both the transaction and query processors operate independently of each other and are separately optimized. However, the query processor apparently can only read data from the intelligent page store.

U.S. Pat. No. 5,495,601 to Narang et al. discloses an alternative approach for separating on-line transaction and device systems support application processing. In this particular embodiment transactions directly effect data at a series of disks through a controller. When a decision support application is processed, a host produces a series of parameters that pass to the controller and represent the selection criteria for records in a data base. The controller then operates on the data base independently of the host to identify those records satisfying the criteria. While this occurs, the host temporarily stores any updates due to transactions in a buffer pool. The decision support system seems to be limited to read-only operations.

U.S. Pat. No. 5,504,888 (1996) to Iwamoto et al. discloses a file updating system employing the temporary connection and disconnection of buffer storage to extended storage. Extended storage becomes available for dedicated use by a batch process that updates data and eliminates contention between resources with an on-line process that is a normally run application that accesses the data on a file disk. During normal operations, during which the batch processing is inactive, read and write transfers requested by the on-line process establish a data path from an on-line process buffer through an extended storage unit to a file disk. When batch processing is to occur this path is terminated; and the on-line process thereafter can only read data from the file disk. The batch process can receive data as needed from the file disk through the extended storage unit but writes data or transfers data updates only to the extended storage unit. When batch processing has been completed, a data path is established from the extended storage unit to the on-line process buffer, and the updated data stored in the extended storage unit transfers to the file disk. This particular approach is adapted for data processing systems particularly involving data bases which are relatively static in content, such that periodic, batch-processed updates are satisfactory. The fact that the on-line process can only perform reading operations while the batch process is active limits the use of this methodology. Such an approach is not readily adapted for use in a data processing system as used in banking, reservations or other systems in which the data base changes dynamically.

U.S. Pat. No. 5,592,660 to Yokota et al. discloses a data base management system that performs retrieval process and updating process operations alternatively. The data processing system in this patent is disclosed in terms of a transaction data base system processing device with a data base storage device and a decision support data base system that includes two decision data base storage devices. Each interval during which the transaction data base system updates a record in the transaction data base is a predetermined time interval. A delayed updating device in the decision support data base system receives a log created by the change to the transaction data base during each predetermined time interval. At each predetermined time interval, the delayed updating device alternatively supplies both the log received at a current predetermined time interval and the log received immediately preceding the current predetermined time interval to a first data base storage device and to a second data base storage device. A retrieving device executes a retrieving process for the second decision data base stored in the second data base storage device when the delayed updating device supplies both logs to the first data base storage device. The retrieving device also executes a retrieving process for the first decision data base stored in the first data base storage device when the delayed updating device supplies both logs to the second data base storage device. In essence, the retrieval job processing accesses one or the other of the two data base storage devices associated with the decision support data base system while the delayed updating part operates with the other of those storage devices.

Most of the foregoing references do not provide alternates for maximizing the availability of a system for processing OLTP or like priority applications, nor do they effect a complete segregation of those processes. Most of the last four cited references fail to provide any suggestions for procedures that will provide data redundancy. Moreover the processing of decision support system or equivalent applications is limited to read only operations. This can limit range of procedures that decision support system applications can perform.

While the Yokota et al. patent discloses separate data processing systems for the transaction job, or OLTP, processing and for the decision support system processes or applications, a data processing system operating in accordance with the disclosure seems to require disk storage capacity of three times the capacity required for storing one copy of the data base. That is, it appears that the primary copy of the data base is stored in one disk for access by the transaction job processing part (i.e., the OLTP processing application). Two additional copies are required for the decision support database system. Still additional storage may be required for maintaining update logs in the transaction job database system. Provisions must be made to transfer the update log information from the transaction job database system to the decision support database system. These transfers will require data processor resources. In many applications, the allocation of such resources from the OLTP processing computer system can introduce intolerable delays in the rate of transaction processing. In addition all data seems to transfer only to the decision support database system. There appears to be no way to transfer data from the decision database system to the transaction job database system.

SUMMARY

Therefore it is an object of this invention to provide a data processing system that includes redundant storage of data and that enables access to the data by multiple processes.

Another object of this invention is to provide a data processing system that stores a data base on redundant storage devices and that enables applications, such as decision support system applications, to run concurrently with other applications, such as on-line transaction processing applications.

Still another object of this invention is to provide a data processing system that stores a data base on redundant storage devices and that enables the system to run applications, such as on-line transaction processing applications, concurrently with other applications, such as decision support system applications, having the capability of altering data stored in a disk storage device.

In accordance with one aspect of this invention a data set is stored in a primary data storage facility that is addressable by a first application. A second data storage facility is configured to correspond to the first data storage facility. A first command establishes the second data storage facility as a mirror for the first data storage facility thereby to replicate the data set in the second data storage facility. A second command terminates the memory mirror function of the second data storage facility and enables the second storage facility to be addressed by a second application concurrently with operations of the first application that utilize the data set in the primary data storage facility.

BRIEF DESCRIPTION OF THE DRAWINGS

The appended claims are intended to point out with particularity and to claim distinctly the subject matter of this invention. The various objects, advantages and novel features of this invention will be more fully apparent from a reading of the following detailed description in conjunction with the accompanying drawings in which like reference numerals refer to like parts, and in which:

FIG. 7 is a diagram that is useful in understanding this invention and the operation of FIG. 6;

DESCRIPTION OF ILLUSTRATIVE EMBODIMENTS

Figure 1:
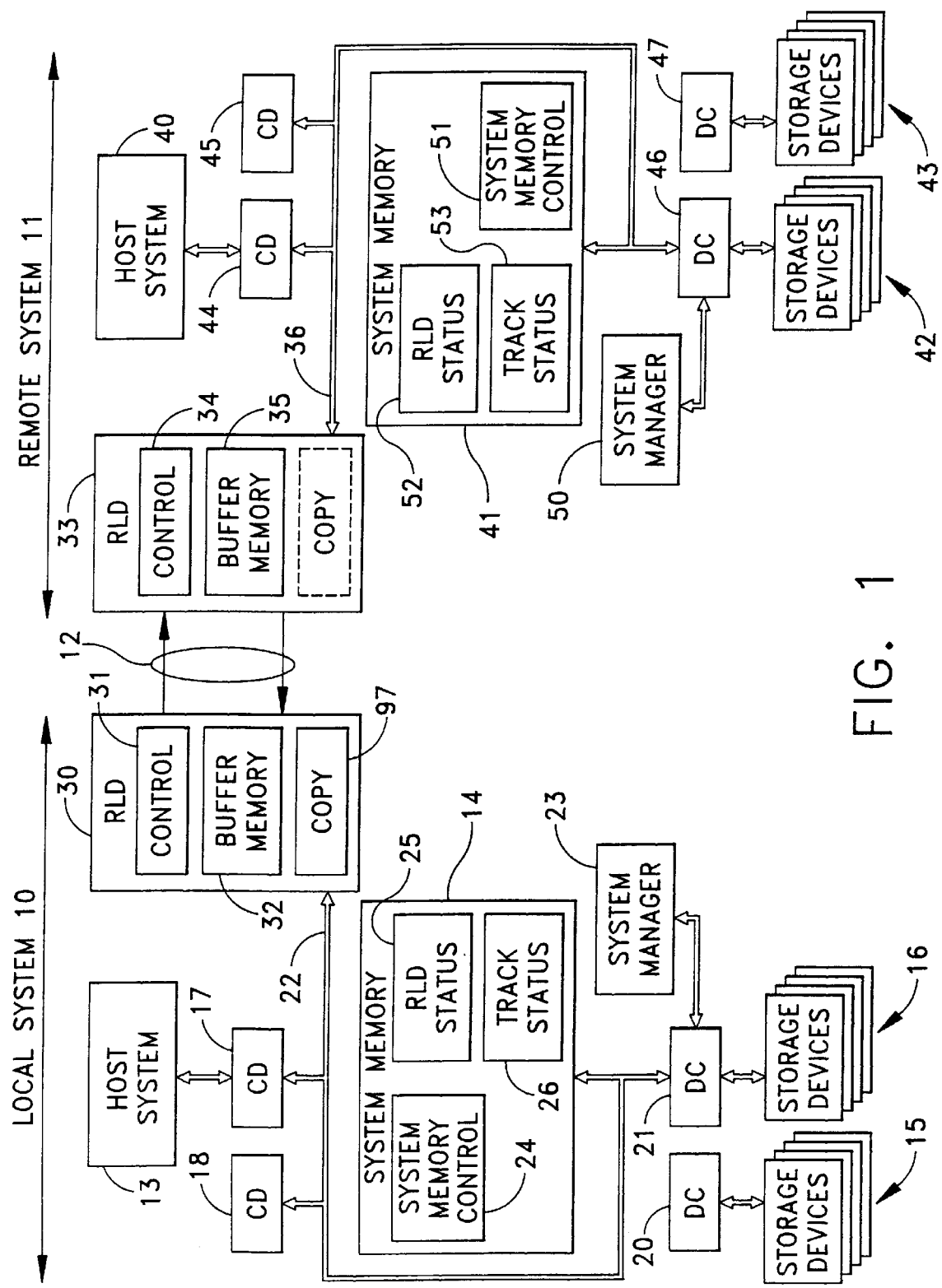
FIG. 1 is a block diagram of interconnected geographically remote data processing systems for operating in accordance with this invention.

FIG. 1 depicts one embodiment of this invention as applied to a data processing network with local and remote systems. In accordance with this embodiment a data processing network comprises two essentially identical data processing systems that include a local system 10 and a geographically remote system 11. A communications link 12, comprising fiber optic cables or high-speed data transmission lines, interconnects the local system 10 and remote system 11. The physical separation between the local system 10 and the remote system 11 can be up to hundreds of kilometers or more.

The local system 10 comprises major components including a host system 13 formed of a host processor and a first data storage facility that includes a system memory 14 and sets or pluralities 15 and 16 of multiple data storage devices or data stores. The system memory 14 can comprise a buffer or cache memory; the storage devices in the pluralities 15 and 16 can comprise disk storage devices, optical storage devices and the like. The sets 15 and 16 represent an array of storage devices in any of a variety of known configurations.

A channel director (CD) 17 provides communications between the host system 13 and the system memory 14; device controllers (DC) 20 and 21 provide pathways between the system memory 14 and the storage device pluralities 15 and 16. A bus 22 interconnects the system memory 14, the channel directors 17 and 18 and the device controllers 20 and 21. A system manager 23 enables an operator to transfer information between the various elements of the system, such as a control 24, a Remote Link Director (RLD) STATUS block 25 and a TRACK STATUS block 26 that are described in more detail later through one of the device controllers, namely the device controller 21 in FIG. 1. Bus access logic, not shown but known in the art, controls transfers over the bus.

Generally speaking, the local system 10 operates in response to commands from one or more host systems, such as the host system 13, that a connected channel director, such as channel director 17, receives. The channel directors 17 and 18 transfer commands to a command buffer in the system memory 14. The command buffer 24 stores data structures and write requests that the device controllers generate. The device controllers, such as the device controllers 20 or 21, respond by effecting a corresponding operation using the information in the command buffer 24. The selected device controller then initiates a data operation. Reading operations transfer data from the storage devices to the system memory 14 through a corresponding device controller and subsequently transfer data from the system memory 14 to the corresponding channel director, such as channel director 17 when the host system 13 initiates the data writing operation.

The local system 10 in FIG. 1 additionally includes an RLD 30 for controlling transfers of data between the local system 10 and the remote system 11 over the communications link 12. The major components of the remote link director 30 include a control 31 and a buffer memory 32. The remote link director 30 connects to the system bus 22 and the communications link 12.

The remote system 11 includes a remote link director 33 that connects to the communications link 12 and includes a control 34 and a buffer memory 35. Signals received from the remote link director 33 transfer over a system bus 36, like the system bus 22, of the remote system 11. The remote system 11, like the local system 10, includes, as its major components, a host system 40, a system memory 41 and storage device sets or data stores 42 and 43. The sets 42 and 43 represent an array of storage devices configured to mirror the sets 15 and 16. In the same fashion as in the local system 10, the remote system 11 includes channel directors 44 and 45 for connection to host systems. In this particular embodiment, the host system 40 connects to the bus 36 through the channel director 44. Device controllers 46 and 47 provide pathways between the system bus 36 and the storage device sets 42 and 43 respectively. A system manager 50 enables an operator to transfer information between the various elements of the system, such as a control 51, RLD STATUS block 52 and a TRACK STATUS block 53 that are described in more detail later. Bus access logic, not shown but known in the art, controls transfers over the bus.

Each of the local and remote systems 10 and 11 may comprise a Symmetrix integrated cached disk array as manufactured and sold by the assignee of this invention according to known operations as described in Yanai et al., U.S. Pat. No. 5,206,939 issued Apr. 27, 1993. Consequently, the following discussion makes only general references to the operation of such systems. For purposes of this invention it is sufficient to understand that the remote system 11 normally acts as a mirror of the local system 10 on a volume-by-volume basis and that the volumes can by physical volumes, although logical volumes are preferred. Given the geographical separation between the local and remote systems 10 and 11, the system in FIG. 1 operates with an extremely high degree of reliability, even in the event of a natural disaster. Normally, the local system 10 is the active system while the remote system 11 acts as a mirror. In such systems transfers from the local system 10 to the remote system 11 normally occur in response to a writing command issued by a local host system such as the host system 13. The details of such a transfer are discussed later.

The host system 40, in such an environment, could be limited to performing read operations in order that the remote system 11 exactly mirror the local system 10. Should some catastrophic event prevent any part of the local system 10 from operating, control can be transferred to the remote system 11 through use of the system manager 50 that would disconnect the remote link director 33 and enable the host system 40 to read and write data to the storage device sets 42 and 43. Mirroring remote data facilities are also known in the art; and Symmetrix remote data facilities supplied by the assignee of this invention provide such remote mirroring capabilities.

Unlike the prior art operation of the local and remote systems like those shown in FIG. 1, a system constructed in accordance with this invention enables the remote system 11 (1) to disconnect from the local system 10, (2) to operate as an independent data processing system with the capability of writing data into the storage device sets 42 and 43, (3) to reconnect to the local system 10 and (4) to resynchronize to the local system 10 automatically. For this specific embodiment, this operation requires two types of information, namely: the status of the remote link directories 30 and 33 and the status of each track or corresponding data block in storage devices in each system. The RLD STATUS block 25 records the status of the remote link directory 30. For purposes of this discussion, it is assumed that the RLD STATUS block 25 has one of three values that represent a "DISCONNECT FOR INDEPENDENT ACCESS" or "INDEPENDENT" status, a "RETURNING" status and an "ONGOING" or normal operating mode status. The INDEPENDENT status value indicates that an operator at the local system 10 or the remote system 11 has utilized the corresponding one of the system managers 23 and 50 to terminate communications between the local system 10 and the remote system 11 for a valid reason that does not constitute a condition requiring any corrective action. The RETURNING status means that the system manager 23 or 50 has just reestablished the communications. During intervals characterized by the "INDEPENDENT" and "RETURNING" status, the remote system 11 does not mirror the local system 10. The ONGOING status means that the local system 10 and the remote system 11 are operating normally and are synchronized.

Figure 2A:
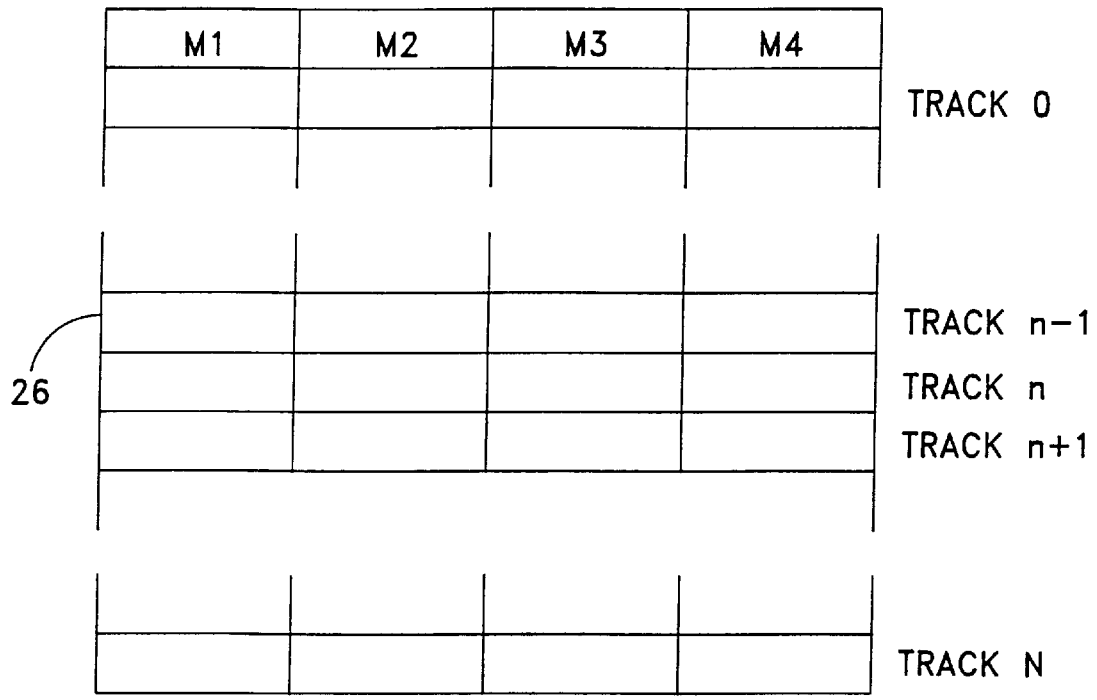
FIGS. 2A and 2B depict the details of TRACK STATUS registers that are useful in implementing this invention.

The TRACK STATUS block 26 comprises a bit map with an entry for each track on the storage device sets 15 and 16; the TRACK STATUS block 53 is a bit map with an entry for each track on the storage device sets 42 and 43. FIG. 2A represents the TRACK STATUS block 26 as a matrix in which each row identifies a track in the storage device sets 15 and 16; in FIG. 2B, the TRACK STATUS block 53 has corresponding rows. In both FIGS. 2A and 2B the columns are headed by M1, M2, M3 and M4 that establishes a correspondence between the bit position and the system containing the TRACK STATUS block in a local system 10 and in each of up to three remote mirroring systems.

It will be apparent that each entry in the blocks 26 and 53 correspond to a data block of a size corresponding to the minimum transfer size. In Symmetrix systems this is typically a track; however, a given track may be divided into multiple blocks or a block might even comprise multiple contiguous tracks. The only change will be the number of rows in each of the blocks 26 and 53, as each row will correspond to one data block.

Figure 2B:
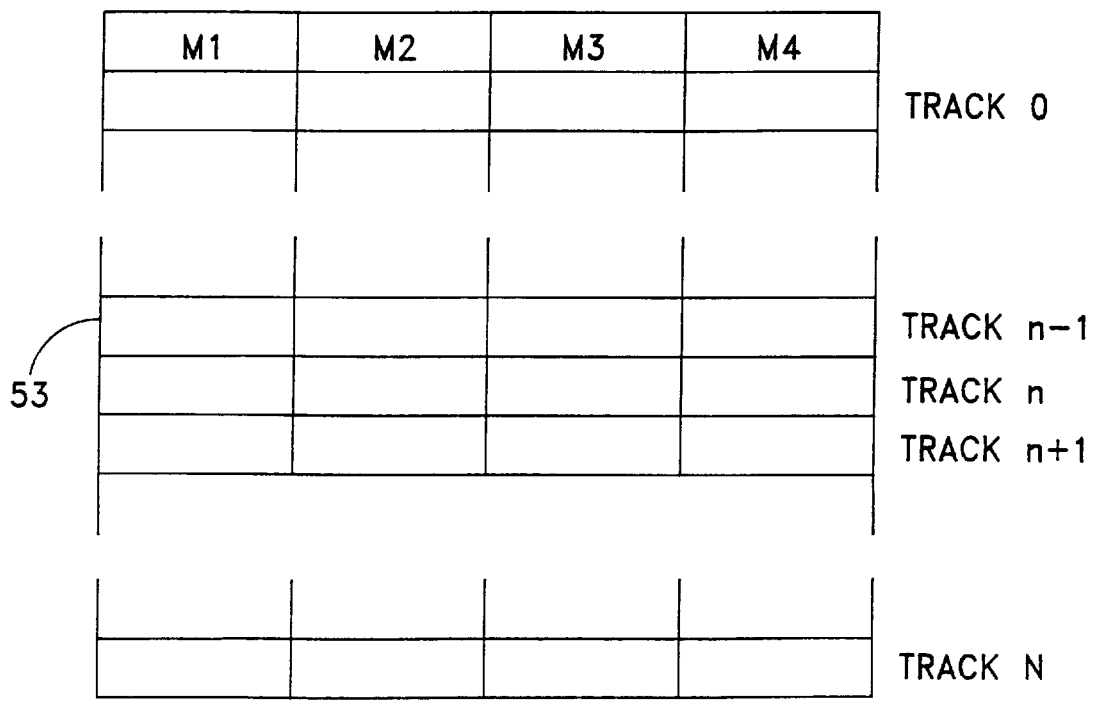

In the system of FIG. 1, only the data columns identified as the M1 and M2 columns in FIG. 2 contain relevant TRACK STATUS data as only one local system 10 and one remote system 11 are present. For any given track the M1 column in FIG. 2A indicates whether the data in the corresponding track in the local system 10 is valid while the M2 column indicates whether the data in the corresponding track in the remote system 11 is valid. Likewise, for any given track the M1 column in FIG. 2B indicates whether the data in the corresponding track in the local system 10 is valid while the M2 column indicates whether the data in the corresponding track in the remote system 11 is valid. In an implementation involving two additional remote systems, the M3 and M4 columns in FIG. 2A would indicate the whether the data in the corresponding tracks in the remaining two mirrored systems were valid. Typically and for purposes of this discussion, a "0" indicates a valid data track or block; a "1", an invalid data track or block.

With this as background, it will now be possible to describe the various operations of these components (1) during a normal mirroring mode, (2) during an independent operating mode and (3) during the return to a normal operating mode.

Normal Mirroring Mode

In a normal operating mode the local system 10 is the active system while the remote system 11 functions solely as a mirror. For example, when the system in FIG. 1 accommodates a database, the local system 10 processes all the OLTP applications including those that can effect changes to the data base. As will be apparent to those of ordinary skill in the art, "application" includes in its meaning programs, routines, subroutines, procedures and processes in whatever form that issue data transfer commands or I/O requests including write commands. For purposes of this description, it is assumed that the host system 13 issues a Channel Control Word (CCW) command including all the necessary parameters from which the system can transfer a data block to or from a particular location in the storage device sets 15 and 16. Other operating systems use other procedures. However, this invention is readily adapted to operate with such systems.

Figure 3:
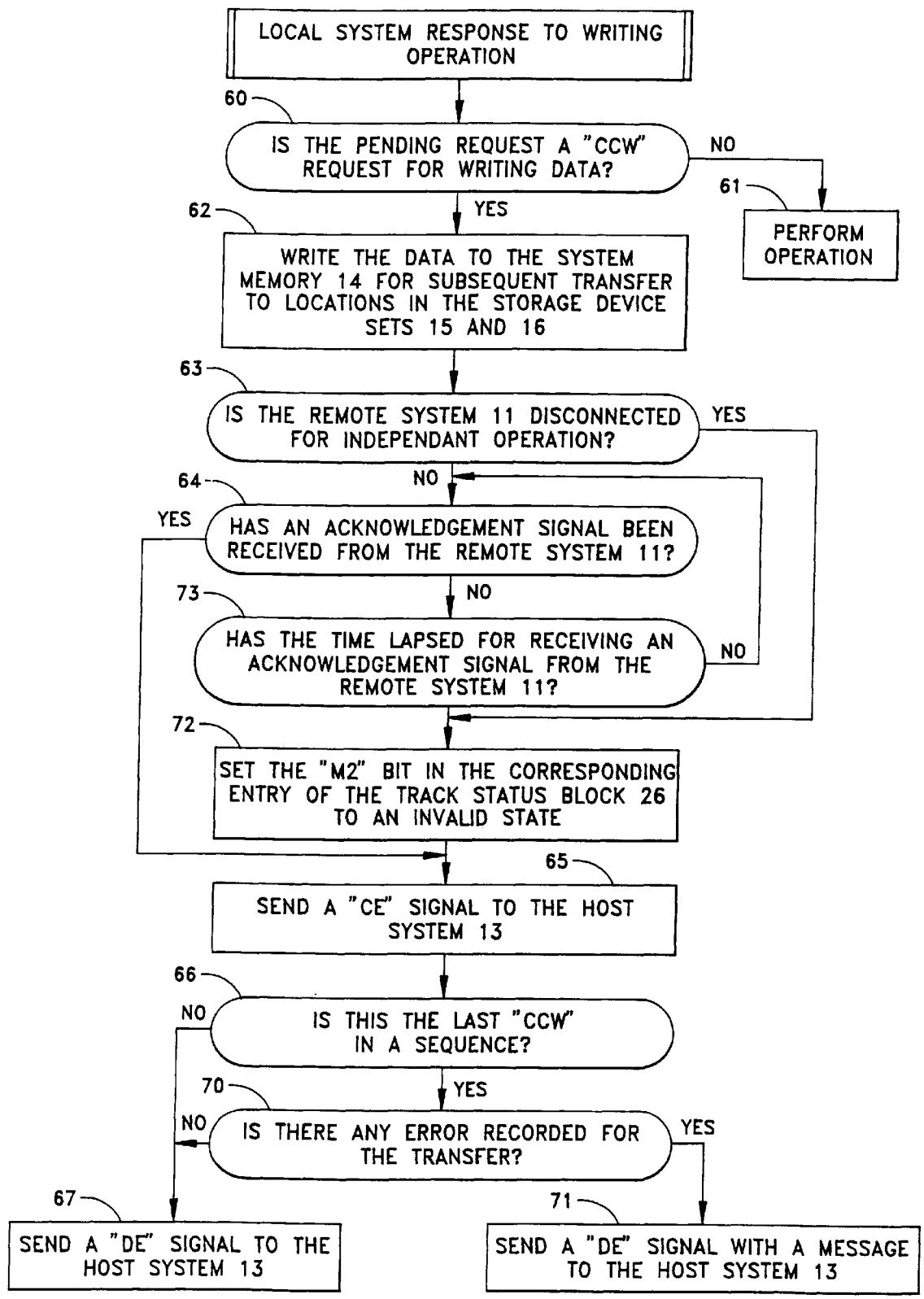
FIG. 3 depicts the process by which a local system as shown in FIG. 1 responds to a writing operation.

When a host system such as the host system 13 in FIG. 1 issues a command, it transfers the CCW command or equivalent to the channel director 17 for transfer to the system memory 14. If the system memory control 24 determines that the pending CCW command will perform an operation other than a writing operation for transferring data to a location in one of the storage device sets 15 or 16, the control 24, in step 60 of FIG. 3, diverts to perform the requested operation in step 61. If the CCW request defines a write operation, control transfers from step 60 to step 62 wherein the information is written into the system memory 14 for subsequent transfer to locations in the storage device sets 15 and 16 in a normal fashion.

During normal mirroring operations, the RLD STATUS block 25 indicates an ONGOING status because the remote system 11 connects to the local system 10 through the remote link directors 30 and 33 and the communications link 12 and because the local system 10 and remote system 11 are synchronized. Consequently control transfers from step 63 in FIG. 3 to step 64 where the system awaits an acknowledgement signal that the remote system 11 has received the data being written to its system memory 41. When this acknowledgement is received under predetermined constraints, control transfers to step 65 wherein the control 24 sends a CE, or Channel End, signal to the host system 13 in step 65. If this is the first or an intermediate CCW command in a sequence, step 66 transfers control to step 67 to send a DE, or Device End, signal to the host system 13. After processing the last CCW command in a sequence step 66 diverts to step 70 to test for any error conditions. If no error has occurred, step 67 sends the DE signal to the host system 13. If an error occurred, control passes to step 71, and the control 24 transfers the DE signal with a message identifying the nature of the error.

Consequently during the normal operating mode any changes the host system 13 makes to the data in the storage device sets 15 and 16 automatically produce corresponding changes in the storage device sets 42 and 43. Moreover in normal operation the storage device sets 42 and 43 or logical volumes therein exactly mirror the corresponding ones of the storage device sets 15 and 16 or logical volumes therein according to configuration information from the system manager 23 and system manager 50. Although the host system 40 is enabled to access data in the storage device sets 42 and 43 in this mode, it can not alter data. It can access data only on a read-only basis. In the normal operating mode and in the context of a data base system, the local system 10 processes all the on-line transaction processing applications by altering the storage device sets 15 and 16 that constitute a primary repository for the data base. The remote system 11 operates only as the mirror of that data base.

Independent Operating Mode

In accordance with this invention, it is possible for the host system 40 in FIG. 1 to operate independently with the capability of writing information to the storage device sets 42 and 43. In the context of a data base system, the host system 40 becomes an independent mechanism for processing decision support system applications to produce reports based upon the data base content.

This operation can begin by using the system manager 50 to block communications through the remote link directors 30 and 33 and communications link 12. Well known processes then update the RLD status registers 25 and 52 in the local system 10 and remote system 11, respectively by shifting the status from a "NORMAL" operating mode to "INDEPENDENT" mode and altering the operations within the local system 10 and the remote system 11 differently.

Referring again to FIG. 3, any writing operation or updating operation that now occurs in the local system 10 still alters data in the storage device sets 15 and 16 in step 62 in FIG. 3. However, in step 63 the control 24 determines that the remote system 11 is disconnected for independent operation because the RLD STATUS block contains the "INDEPENDENT" status. In step 72 the control 24 updates the corresponding TRACK STATUS block 26 to indicate that the remote system 11 no longer contains valid data in the corresponding track because it is not possible to transfer the new data to the remote system 11. In the system of FIG. 1 the corresponding register on the block 26 would be sent to "01" for the M1 and M2 sets. The operation of step 72 also occurs if step 73 indicates that a time interval has elapsed without the receipt of an acknowledgement signal, during the normal operating mode.

Thus during the independent operating mode the host system 13 continues on an uninterrupted basis to process on-line transaction processing applications or other priority functions on the data base or other data collection in the storage device sets 15 and 16. This occurs with no significant increase in the time required because the only additional requirement is to set the "M2" bit in the corresponding entry of the TRACK STATUS block 26 to an invalid state (e.g., a "1") in step 72 and because the control 24 performs this function.

Figure 4:
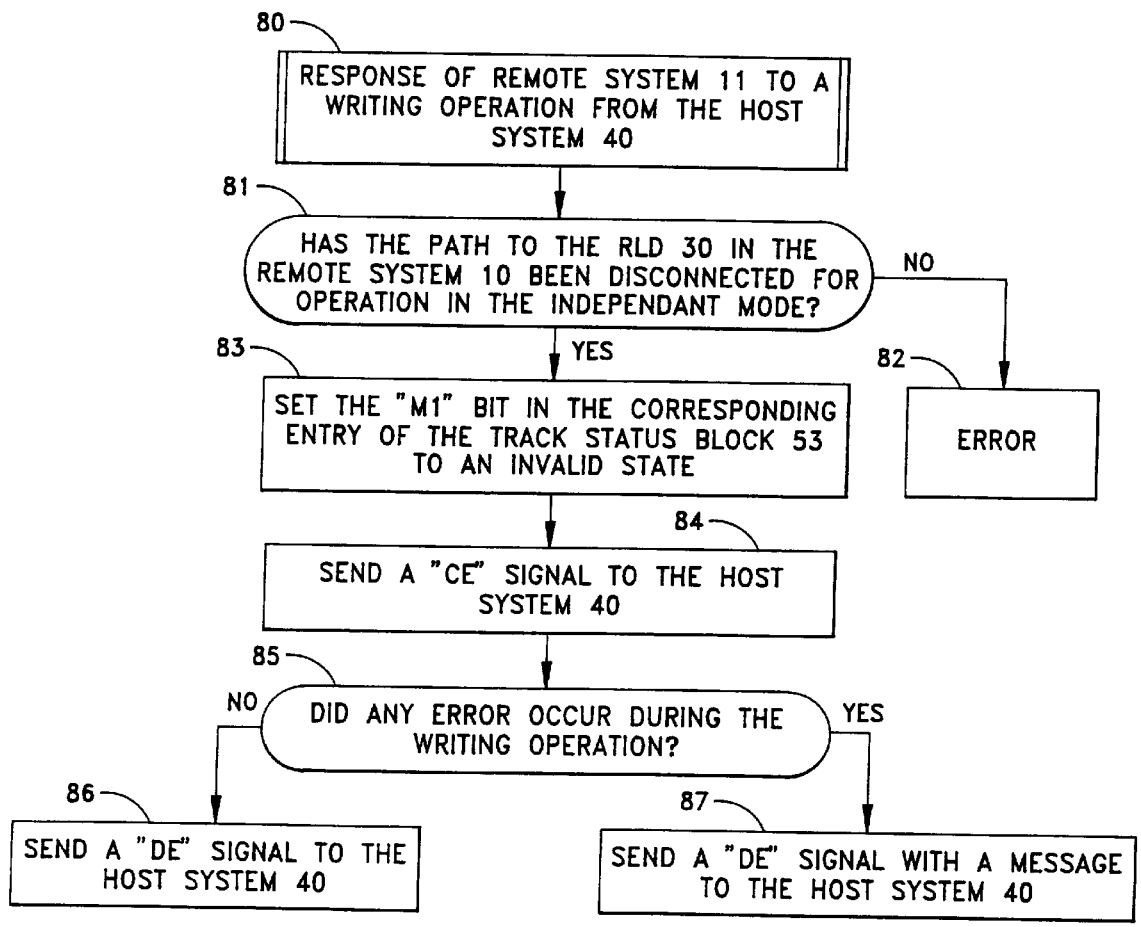
FIG. 4 depicts the process by which a remote system shown in FIG. 1 responds to a writing operation.

Once the communications link 13 has been disabled, the remote system 11 responds according to FIG. 4. In step 80 the host 40 is enabled to issue a CCW command that involves writing data. Step 81 determines that in fact the system is operating in the independent mode. If not, the control 51 diverts its activities to step 82 to initiate an appropriate error procedure. Otherwise in step 83 the control 51 sets the M1 bit in the corresponding entry of the TRACK STATUS block 53 to an invalid state (e.g., the M1 and M2 bits have the value "10") to denote that the specified track in the disk storage sets 42 and 43 no longer mirrors the corresponding track in the storage device sets 15 and 16. In step 84 the control 51 sends a "CE" signal to the host system 40. Step 85 diverts to step 86 to send a DE signal to the host system if no error occurs or to step 87 to send a DE signal with an appropriate message to the host system 40 if an error occurs. Thus, during this independent operating mode, the host system 40 processes decision support system or other applications that may alter the content of the storage device sets 42 and 43. However, step 83 assures that an historical record of those changes is maintained. During this operation the direct support system determines which data to write and has the responsibility for assuming that it does not alter data to be used later in a process.

Figure 5:
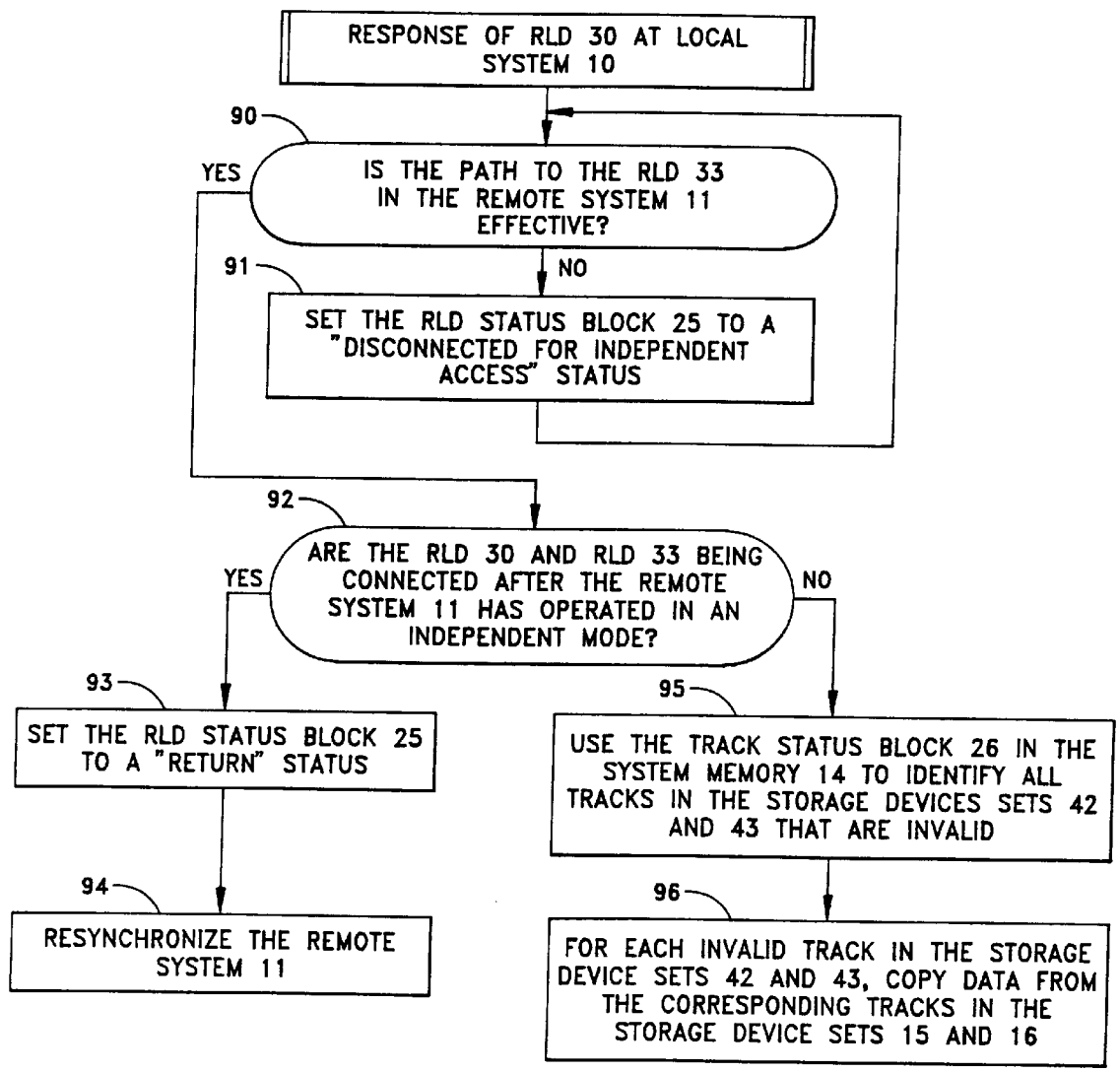
FIG. 5 depicts the operation of a remote link director shown in FIG. 1.

FIG. 5 depicts the pertinent operation of the remote link director 30 at the local system. The control 31 in step 90 determines whether the path through the communications link 12 to the remote link director 33 is effective. If it is not, the control 31 sets the RLD status to the "DISCONNECT FOR INDEPENDENT ACCESS" status referred to above in step 91. Once the path is disabled, the status remains unchanged until a reconnection at the end of the independent operating mode.

Return to Normal Operating Mode

When the processing of decision support system or equivalent application concludes, the system manager 50 reestablishes the connection through the communications link 12 and reverts the remote system 11 to the normal operating mode. Now any attempt by the host system 40 to write data will cause step 81 in FIG. 4 to divert to the error procedure 82.

Simultaneously the control 31 shifts control from step 90 in FIG. 5 to step 92 and determines whether the connection is being made after the remote system has operated in an independent mode based upon information contained in the RLD STATUS block 25 or any alternate location within the remote link director 30. If it is, the control 31 sets the RLD STATUS block 25 to a "RETURN" status in step 93 to indicate a return to the normal operating mode during which resynchronization will occur. Then in step 94 the control 31 resynchronizes the local system 10 and remote system 11. Generally, the control 31 retrieves the TRACK STATUS block 53 from the remote system 11 and effectively identifies all the tracks in the storage device sets 42 and 43 that have invalid tracks either because the host system 13 altered tracks in the data storage sets 15 and 16 or because the host system 40 altered tracks in the data storage sets 42 and 43 during the independent operating mode. A more detailed description of the resynchronizing procedure of step 94 appears below.

Still referring to FIG. 5, if the two remote link directors 30 and 33 have disconnected for other reasons, then step 92 transfers to step 95. The control 31 uses only the status block 26 to identify all of the tracks in the storage device sets 42 and 43 that are invalid. This operation, for example, could occur if a particular storage device in the one of the storage device sets 42 and 43 became inoperable for any period of time. In step 96 a copy program 97 in the RLD 30 in FIG. 1 transfers data from identified tracks in the storage device sets 15 and 16 to corresponding tracks in the storage device sets 42 and 43.

Figure 6:
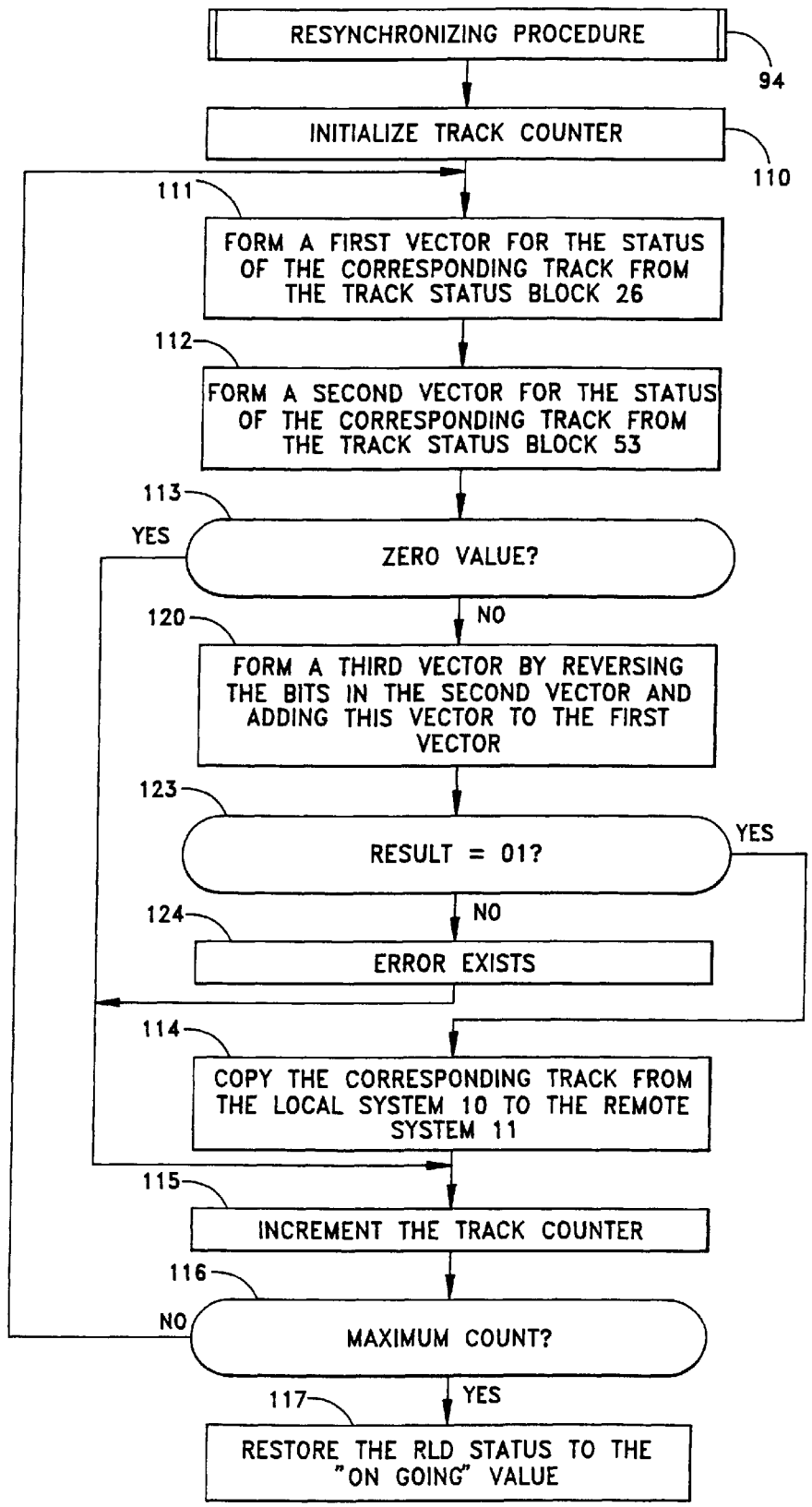
FIG. 6 is a more detailed sequence of the remote link director shown in FIG. 5.

In one embodiment of this invention, the control 31 performs the resynchronization process of step 94 according to a procedure of FIG. 6. Before discussing this procedure in detail, it will be helpful to understand that at the end of the independent operating mode the collection of bits assigned to a specific track in the TRACK STATUS blocks 26 and 53 and assigned to the local system 10 and mirroring remote system 11 can define only one of four valid bit patterns. In FIG. 7, rows 100, 101, 102 and 103 define these four valid bit patterns of the TRACK STATUS blocks for a given track. Column 104 shows the values of the M1 and M2 bits in the TRACK STATUS block 26 for that track; column 105, the values of the M1 and M2 bits in the TRACK STATUS block 53 for the corresponding track.

Still referring to FIG. 7, if neither the host system 10 nor the host system 40 alters information in a track during the independent operating mode, the corresponding M1 and M2 bits in each of the TRACK STATUS blocks 26 and 53 will be "0" as shown in row 100 and columns 104 and 105. If only the host system 40 alters information in a track, the values of the M1 and M2 bits will be "10" as shown in row 101 at column 105; the M1 and M2 bits in the TRACK STATUS block 26 remain "00". In the context of the independent operating mode this means that the data in the track of the storage device sets 42 and 43 is altered, but valid with respect to the procedure being executed by the host system 40. If only the host system 13 alters information in a track, the M1 and M2 bits in the TRACK STATUS block 26 become "01" while the corresponding bits in the TRACK STATUS block 53 remain "00" as shown at row 102 under columns 104 and 105 respectively. The fourth valid bit pattern results when both the host system 13 and the host system 40 alter data in a track. In that event, as shown in row 103, the bit patterns in the TRACK STATUS blocks 26 and 53 are "01" and "10" respectively.

As previously indicated, FIG. 6 depicts the process by which in step 94 in FIG. 5 the control 31 in FIG. 1 uses these bit patterns to resynchronize the systems. This process is iterative in nature and under the control of a loop controller in the form of a track counter (not shown, but located within the RLD 30) that the process initializes in step 110. In step 111 the control 31 forms a first vector corresponding to the data located in column 104 of FIG. 7 from the TRACK STATUS block 26. In step 112 a similar action forms a second vector corresponding to the data located in column 105 of FIG. 7 from the TRACK STATUS block 53.

In step 113, the control 31 determines if the concatenated first and second vectors has a "ZERO" value, as would occur if the vectors corresponded to the values in row 100 of FIG. 7 indicating that no change occurred to the track in either of the storage devices in sets 15 and 16 or sets 42 and 43. If this occurs, control passes to a loop control comprising step 115 that increments the track counter to point to a next track in sequence. In step 116 the control determines if all the tracks have been tested by comparing the track counter contents to a maximum value. If more tracks need to be examined, control passes back to step 111. Otherwise the resynchronizing process is complete, and step 116 transfers control to step 117 to restore the status in the RLD STATUS block to the "ONGOING" value indicating a return to normal mirroring operations.

If the concatenated first and second vectors do not have a "ZERO" value, the control 31 transfers from step 113 to step 120 to form a third vector by reversing the bits in the second vector and summing the first and third vectors. FIG. 7 depicts the effect of the bit reversal, or swap, in column 121. Such swapping procedures are well known. If the swap did not occur in step 120, the M1 bit in the TRACK STATUS register 26 could be set erroneously to an invalid value that would effectively delete valid data from the data base.

Column 122 depicts the sum provided in step 120 by performing a logical inclusive "OR" operation on the first vector in column 104 and the third vector in column 121. Rows 101, 102 and 103 show that the sum in each case is "01". With reference to the local system 10, this value indicates that the track in the local system 10 is valid while the corresponding track in the remote system 11 is no longer valid with respect to the data in the data storage sets 15 and 16.

As will now be shown, any other value represents an error condition. A "1" in the M1 bit in column 104 indicates that the data in the local system 10 is invalid; consequently, no action should be taken to transfer this data to the remote system 11. Similarly, a "1" in the M2 bit position in column 105 indicates that the data in the remote system 11 is invalid. This occurs only if some fault exists with respect to a track; consequently, no action to be taken to transfer any data to this track until after the fault is cleared.

In step 121 the control 31 determines the value of the sum. If the value is other than "01", then, as previously indicated, an error exists. The control 31 terminates any further processing with respect to the particular track by noting the error in step 122 through an error condition detection scheme or interrupt handler and then transfers to step 115 in the loop control.

If the sum for the status of a track in step 121 is "01", the tracks need to be resynchronized. Step 121 then transfers to step 114 to copy the track from the local system 10 to the remote system 11. Next the system transfers operations to step 115 in the loop control.

When step 116 shifts control to step 117, the resynchronizing process of FIG. 6 has tested the bit patterns for each track and copied only those that are needed to resynchronize the data. This operation occurs concurrently with normal operations so that during the process any changes the host system 13 makes to the data also produces a change in the remote system 11. If the host system 13 alters a track during the process, the new data transfers to the remote system 11 conventionally. If the host system 13 alters the track before it is processed by the resynchronizing process and the M1 and M2 bits in the TRACK STATUS block 53 still remain at a "10" value, such as shown at rows 101 and 103 of FIG. 7, the copy program 97 will merely recopy the data from the local system 10 to the remote system 11.

As previously indicated it is possible to modify the network shown in FIG. 1 by adding a third and even a fourth system interconnected through corresponding communications links. The interconnection of three systems could then provide a first system like the local system 10 dedicated to process OLTP or other priority applications, a second remote system like the remote system 11 operating as a mirror and as a mechanism for performing decision support system or other applications, and a third system that always operates to mirror the data in the first system. Alternatively, the third system could also be adapted for running other applications in an independent operating mode.

The general approach of redundancy and dedicated OLTP or other priority processing of this invention is particularly effective because the percentage of operations that alter the data on a disk rarely involve the system for a majority of its time. Normally, significantly less then half of all disk operations involve writing operations or data changes. Further the remote system can operate as a decision support system because generally such programs operate with respect to a snapshot of the data base taken at a particular time and because an individual application normally requires only a very short time. In this particular embodiment that snapshot represents the data base at the instant the system manager 50 disables transfers through the communications link 12.

When implemented as described above, the network shown in FIG. 1 meets the objectives of this invention. Given the relatively short times required to process decision support systems, the local system 10 and the remote system 11 operate in a mirrored configuration for the vast majority of time to provide redundancy. However when it is necessary to obtain a report or answer to a query, the operation occurs simultaneously with the continued operations within the local system 10 and without any intervention by the local system 10 that could adversely affect its operating characteristics. Moreover immediately upon completion of the report or query, local and remote systems resynchronize to reestablish a mirror relationship. Typically the number of tracks that need to be updated will be minimal, so that the time required to resynchronize the system after running decision support system applications will be minimal. Moreover the copy program 97 by virtue of its being located in the remote link director 30 performs this resynchronization independently of the on-line transaction processing or other priority application.

ALTERNATE EMBODIMENTS

Unexpectedly it has been found that the underlying principals and invention incorporated in the foregoing embodiment of FIGS. 1 through 7 have application in other data processing system configurations. Specifically it has been found that with some modifications it is possible to use the track status information, like the information in the track status blocks 26 and 53 of FIG. 1, to attain the concurrent access to a common database or data set in accordance with this invention at a single site, such as the site of the local system 10 of FIG. 1, or at multiple sites, such as the sites of the local and remote systems 10 and 11. Moreover it has been found that this concurrent access can be attained by allocating storage space within a given storage system or adding a storage system at one or the other of the sites.

Figure 8:
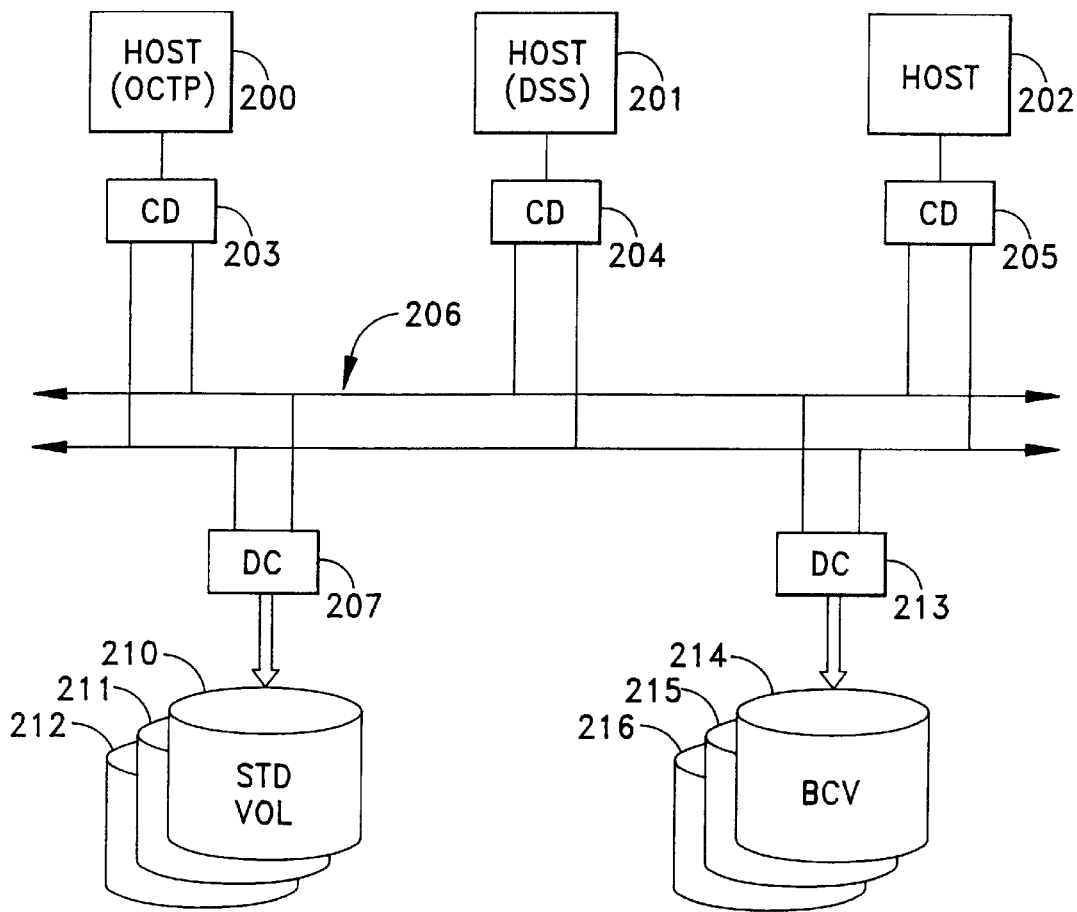
FIG. 8 is a simplified version of the local system 10 shown in FIG. 1 with a plurality of host systems and a business continuation volume (BCV) device in accordance with another aspect of this invention.

FIG. 8 that represents one embodiment of a local system 10 shown in FIG. 1 that includes multiple host systems 200, 201 and 202 as shared, independent system resources. More specifically the host 200 could respond to one type of application, such as an OLTP application; host 201, to a DSS application; and host 202, to a backup, other OLTP or DSS application.

Each of the hosts 201 through 202 connects through a corresponding channel director 203 through 205 in a storage system. The channel directors constitute one form of a host adapter that is particularly used in many mainframe applications. Other host adapters include ESCON or SCSI adapters. Such adapters are well known in the art. For purposes of this description the phrases "host adapter" and "channel directors" will be used interchangeably. However, it will be apparent that any other type of host adapter could be substituted for the specifically disclosed channel directors.

Figure 10:
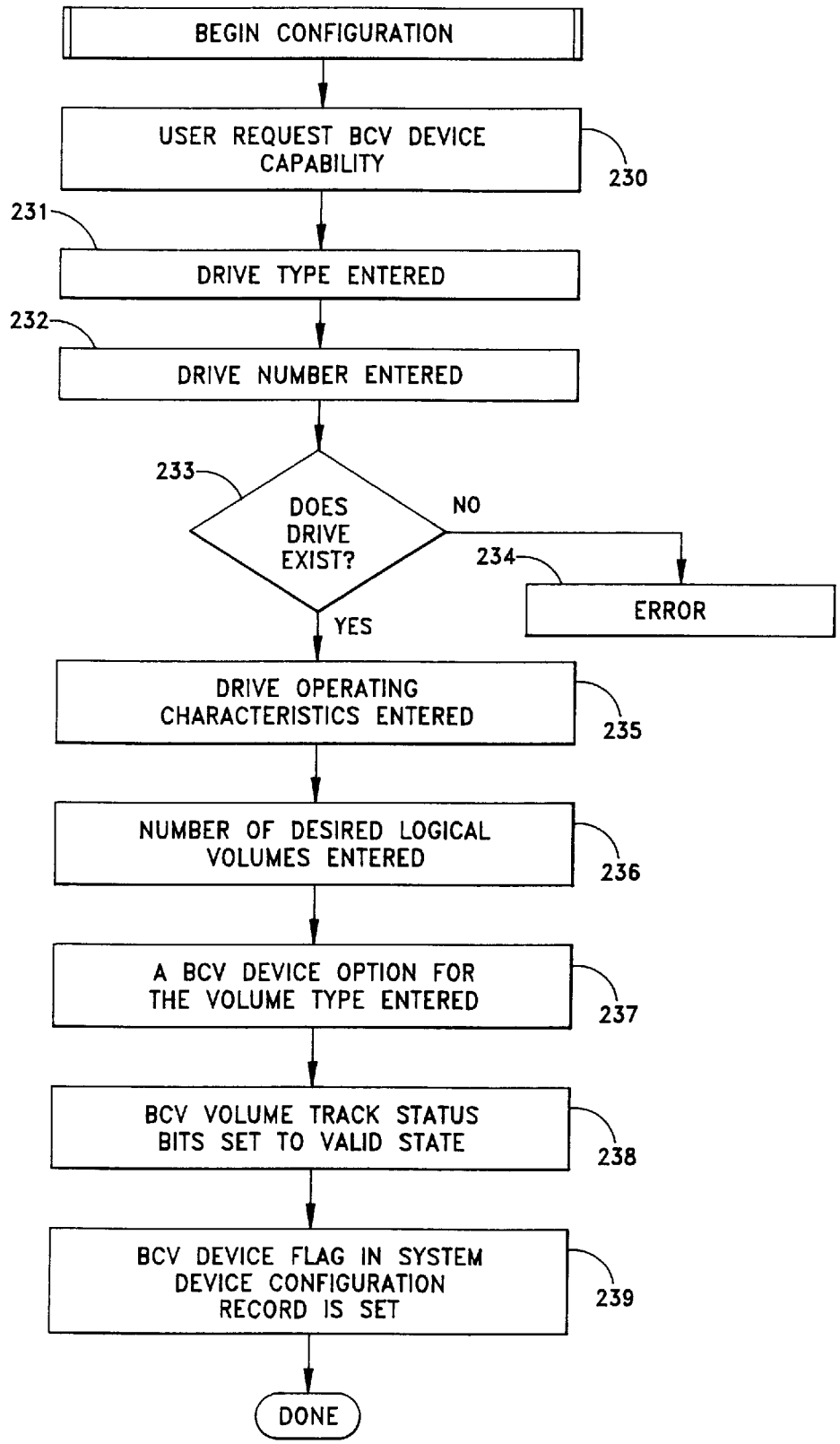
FIG. 10 depicts the procedure for producing the configuration in FIG. 9.

A bus system 206, typically a parallel bus network, interconnects the channel directors 203 through 205 with device controllers 207 and 213 that are analogous to the device controllers 20 and 21 in FIG. 10. In this particular embodiment, however, the device controller 207 controls the operations of a series of physical disks which are shown in terms of three logical volumes 210, 211 and 212. The segmentation of physical disks into logical volumes is well known in the art.

Similarly a device controller 213 interfaces another series of logical volumes 214, 215 and 216 to the bus 206. In accordance with this invention, each of these volumes 214 through 216 is defined as a Business Continuation Volume and is designated a BCV device. Each BCV device comprises a standard disk controller and related disk storage devices as shown in FIG. 1 especially configured to independently support applications and processes. The use of these BCV devices, as will become apparent, enables a host such as host 201 to utilize instantaneous copies of the data in the standard volumes 210 through 211. Moreover, as will become apparent, there typically will be at least one BCV volume assigned to each host device that will operate on a data set concurrently. If hosts 201 and 202 are to have the capability of performing DSS and backup applications concurrently on different volumes, then the system in FIG. 8 would have at least two BCV devices as opposed to the three BCV devices in FIG. 8.

As will also become apparent, the use of a BCV device allows concurrent access to a single data set by the host 200 and 201, but allows the host 200 to continue OLTP or like processing without any impact or load on the resource 200 and the volumes 210 through 212. The resource load for performing DSS or like applications is transferred entirely to the host 201 and to one of the BCV volumes 214 through 216. All of this is essentially transparent to the user.

Figure 9:
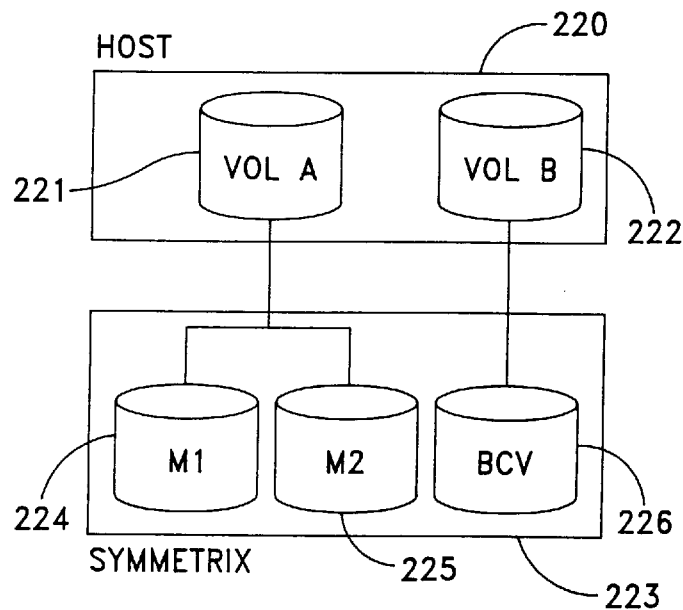
FIG. 9 is a simplified version of the system shown in FIG. 8 that depicts a logical organization after initial configuration of the system with a BCV device.

The operation of a BCV device and its corresponding BCV volume or volumes is more readily understood in terms of data sets stored in logical volumes. As known, any given logical volume may be stored on a portion or all of one physical disk drive or on two or more disk drives. However, the number of physical disk drives is not important to an understanding of this invention. FIG. 9 depicts a single host 220 containing two types of applications. In the context of an OLTP/DSS set of application programs, a Volume A application 221 could represent an OLTP application that operates on a data set in a logical Volume A and a Volume B application 222 could represent a DSS application or a backup application or an application of updating a database stored in Volume A. Although FIG. 9 depicts a single host, it is obvious that, in appropriate situations, the Volume A and B applications 221 and 222 could be assigned to separate hosts.

In FIG. 9, a storage unit 223 is represented as comprising two disk volumes that are mirrors. They are an M1 volume 224 and an M2 volume 225. In accordance with this invention, a third storage volume 226 comprises a BCV device 226. In this particular embodiment the M1 and M2 devices 224 and 225 can actually comprise multiple physical disks as might be incorporated in a RAID-5 redundancy. In such an event the BCV volume would also comprise multiple disks so that the BCV device could act as a mirror. Generally each mirror volume and the BCV device will be on physical disk drives that connect to separate device controllers, as known in the art.

In accordance with one embodiment of this invention, a configuration procedure establishes configurations similar to that shown in FIG. 9. Once this relationship is established, the host 220 in FIG. 9 can issue a number of commands to establish the BCV device 226 as another mirror, to split the BCV device 226 as a mirror and reestablish a data transfer path with the volume 222, to reestablish the BCV device as a mirror 226 and to restore data from the BCV device 226 when it operates as a mirror synchronized to the storage devices 224 and 225. Each of these operations will now be discussed in detail.

Configuration

FIG. 10 depicts the steps that establish the configuration shown in FIG. 9. In step 230 a user requests BCV capability and initiates the procedure of FIG. 10 and identifies the drive type and the drive number in steps 231 and 232 thereby to identify a particular physical disk drive. The physical drive normally will be the same as the physical disk drives storing the data set. It may even be formed as a volume on an existing disk drive. In whatever form, if the designated drive does not exist, a test at step 233 diverts to a process by which an appropriate error message is returned in step 234. Assuming the drive does exist, the user enters the drive operating characteristics in step 235 such as the number of cylinders, enters the number of desired volumes in step 236 and defines, as a volume type, a BCV device. Step 238 sets BCV volume track status bits in its corresponding track status block to a valid state. The step 239 sets a BCV device flag in a system device configuration record. Thus when the procedure in FIG. 10 is completed, a Volume A application 221 can execute data transfers with data in the mirrored M1 and M2 disk volumes 224 and 255 while a Volume B application 222 has a data path to the BCV device 226 and can communicate with the BCV device by use of a application related address or identification.

As previously indicated, the data storage system such as the local system 10 in FIG. 1 includes a track status block 26 that incorporates M1 through M4 bits as previously defined. In this particular example, the M1 and M2 bits refer to the M1 and M2 mirrored disk volumes 224 and 225. Step 238 sets all the M3 bits to an invalid state so no transfer will be attempted. In addition, a Not Ready (NR) status will define the BCV device 226. The M3 mirror is selected because it is the next available mirror in this particular configuration as previously indicated. All the bits in the M4 bit position will be set to be invalid state because there is no M4 mirror. If the storage facility were normally operated with three permanent mirror devices, the BCV device 226 would be designated as the M4 mirror device. Assuming that the M1 mirror 224 and the M2 mirror 225 are in synchronism, the M1 bits and M2 bits will all have a valid setting. Once this configuration is achieved, it remains until the host 220 issues an ESTABLISH command because at this point the volume in the BCV device 226 contains no data.

ESTABLISH Command

The ESTABLISH command effectively isolates the Volume B application 222 of the host 220 and the BCV device 226. In this particular case the ESTABLISH command effectively connects the BCV device 226 as an M3 mirror volume to define a BCV pair with the mirrored storage Volume A. Now the BCV device 226 status as seen by the Volume B application 222 is Not Ready (NR). The status as seen by the Volume A application 221 and copy program is Ready. All the M3 track status bits are set to an invalid state. Consequently the copy program, that normally maintains the mirrored storage devices in synchronism, copies data from a designated one of the M1 and M2 mirror storage devices 224 and 225 to the BCV device 226 operating as the M3 mirror. When the BCV device 226 synchronizes with the other mirror devices, normal mirroring operations continue to all mirror storage devices including the BCV device 226.

Figure 12:
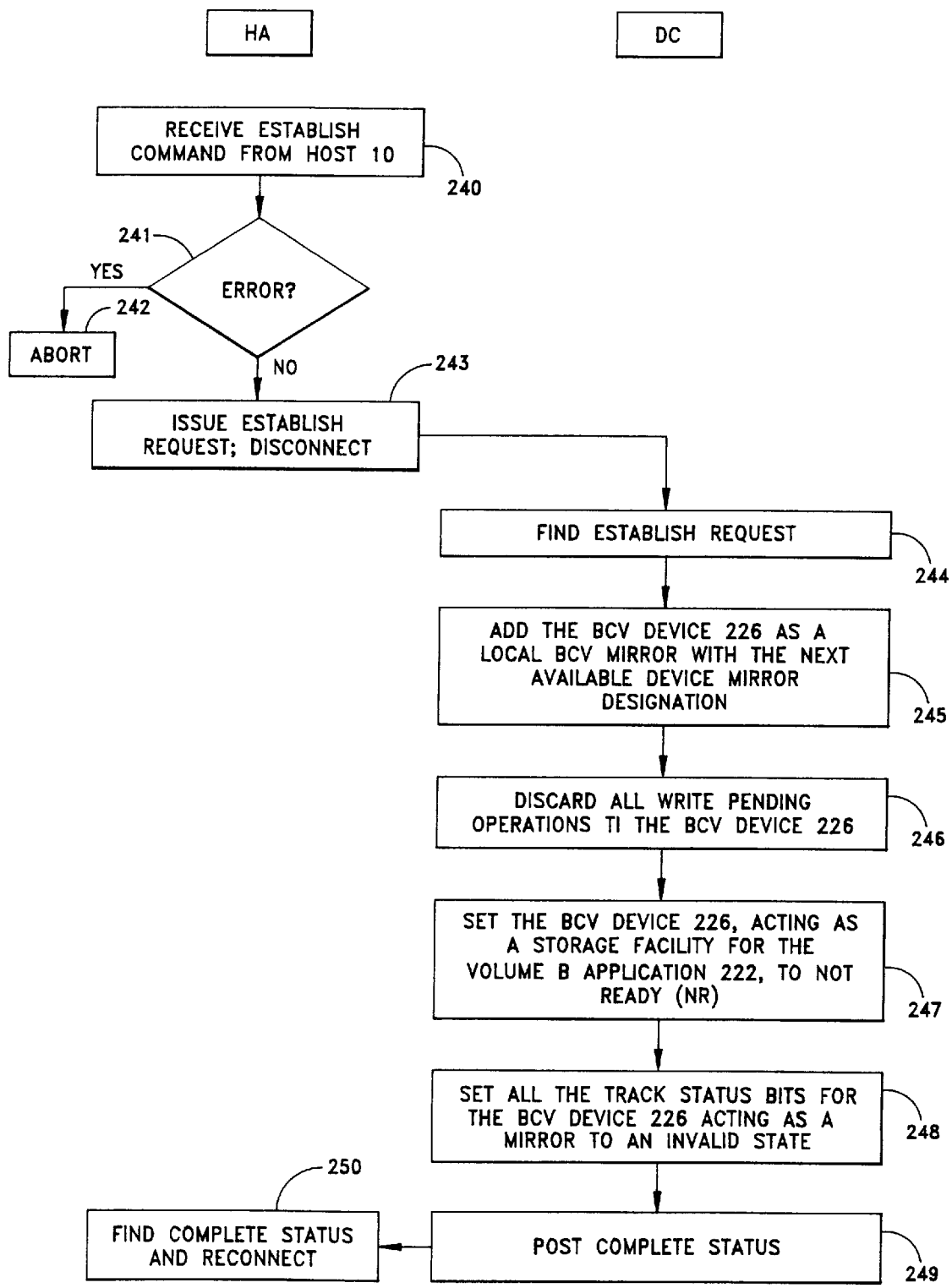
FIG. 12 depicts the procedure for establishing the connection shown in FIG. 11.

Referring to FIG. 12 a host adapter receives the ESTABLISH command in step 240 and tests for any error conditions in step 241. If any error conditions exist, control transfers to step 242 wherein the response to the command terminates and the host adapter returns an error code. Error codes indicating a non-existent standard device, a BCV device 226 already in use with another volume where a simple BCV device contains multiple volumes, an inconsistency in the size or emulation types are typical error conditions that can cause step 241 to divert to step 242.

If the tests of step 241 are all passed satisfactorily, appropriate data is returned to the host adapter and in step 243 the host adapter issues a request corresponding to the ESTABLISH command. Then the host adapter effectively disconnects from the BCV device 226. As a result no further communications can occur with any host.

The device controller receives the request corresponding to the ESTABLISH command in step 244. It then adds the corresponding BCV device 226 as a local BCV mirror with the next available standard device mirror as previously described. In the particular embodiment shown, it adds the BCV storage device 226 as the M3 mirror. Various bookkeeping operations, that do not form part of this invention, but are well known in the art, are also performed. Moreover as any further communications between the Volume B application 222 and the BCV device 226 are no longer possible, step 246 discards any write pending operations from the BCV device 226 contained in the device controller attached to the BCV device 226. In step 247 a Not Ready (NR) status is established for the BCV device 226 as it relates to the Volume B application 221. In step 248 the BCV mirror track states bits, i.e., the M3 bit positions in the track status block; such as the track status block 26 in FIG. 1, are set to an invalid state. Next the system posts a complete status in step 249 in terms of a return instruction that is passed through to the host adapter in step 250 thereby to enable the continued communications with other hosts to resume. As previously indicated once this is complete, a copy program such as the copy program 100 in FIG. 1, copies all the data, typically from the M1 mirror device 224, to the M3 BCV mirror device 226. When synchronized, the storage unit 223 will contain three copies of the data set, one in each of the mirror devices 224 and 225 and the BCV device 226.

SPLIT Command

Figure 11:
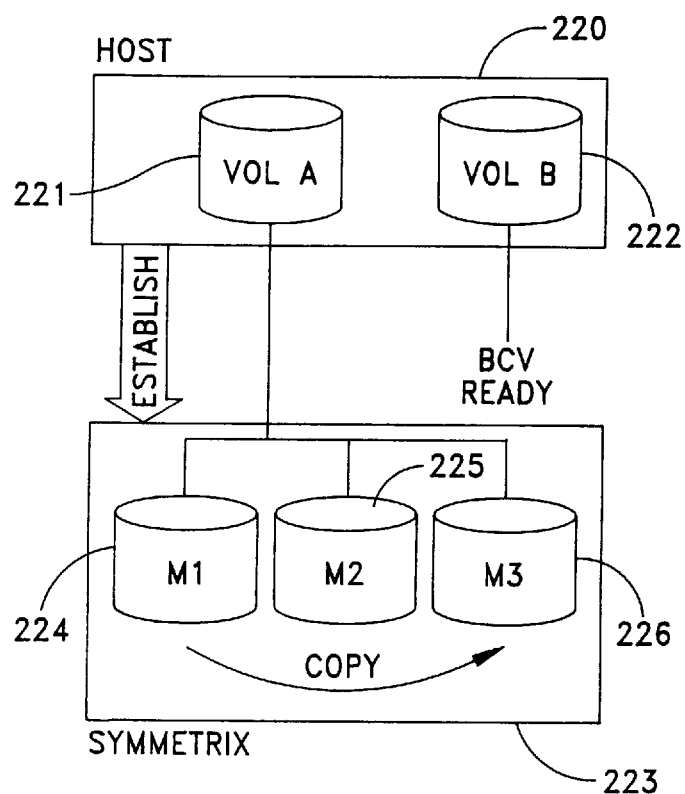
FIG. 11 depicts the logic organization in FIG. 9 after establishing a BCV device as a local mirror.
Figure 14:
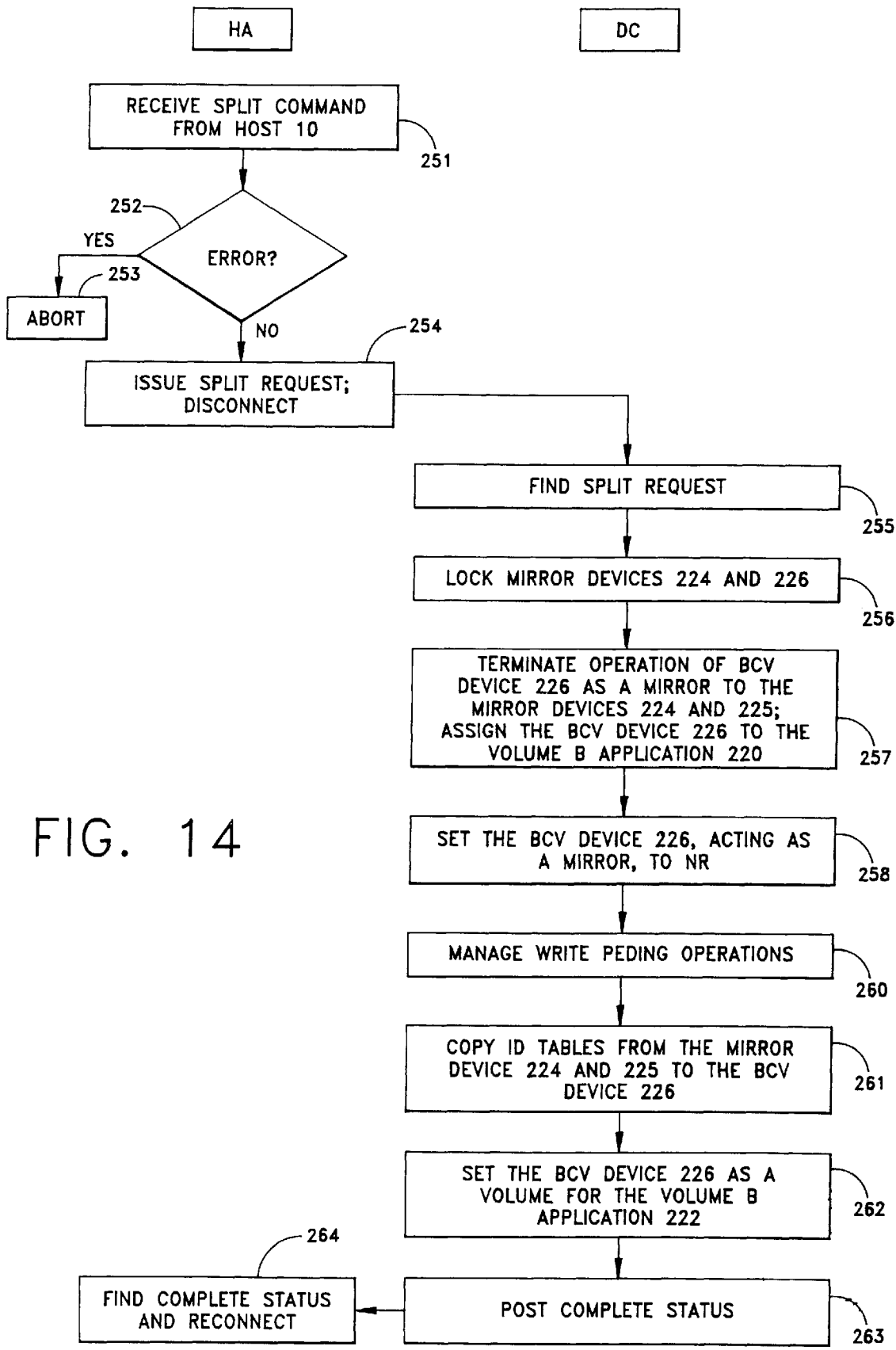
FIG. 14 depicts the procedure for establishing the connection shown in FIG. 13.

The configuration in FIG. 11 continues until after synchronization of the M3 BCV volume 226 is established. The SPLIT command, when applied to the configuration shown in FIG. 11, reestablishes a path between the Volume B application 222 and the BCV device 226. The procedure, as set forth in FIG. 14, is initiated when the SPLIT command is received by the host adapter in step 251. The host adapter tests various conditions in step 252. One particular test determines whether the BCV device 226 is in synchronism with the other mirrors. If an error condition exists, step 252 diverts to step 253 to abort the response. Otherwise step 254 issues a SPLIT request to the device controller 21 and blocks any further communications to the device controller from other hosts.

In step 255 the device controller for the BCV device 226 receives the SPLIT command or request. The M1 and M2 mirror devices 224 and 225 are locked to prevent any activity during the response to the SPLIT command. This prevents any new writes from being posted from other hosts to the device while the response to the SPLIT command is in process. In step 257 the device controller removes the BCV mirror from the standard device and reassigns it to its original BCV device address 226. Various bookkeeping procedures such as updating device records to reflect a configuration change are accomplished. Next the status of the BCV device 226 in the context of its mirror operation is discontinued by setting the device to a Not Ready (NR) state with respect to the system responsive to the Volume A application 221.

Figure 13:
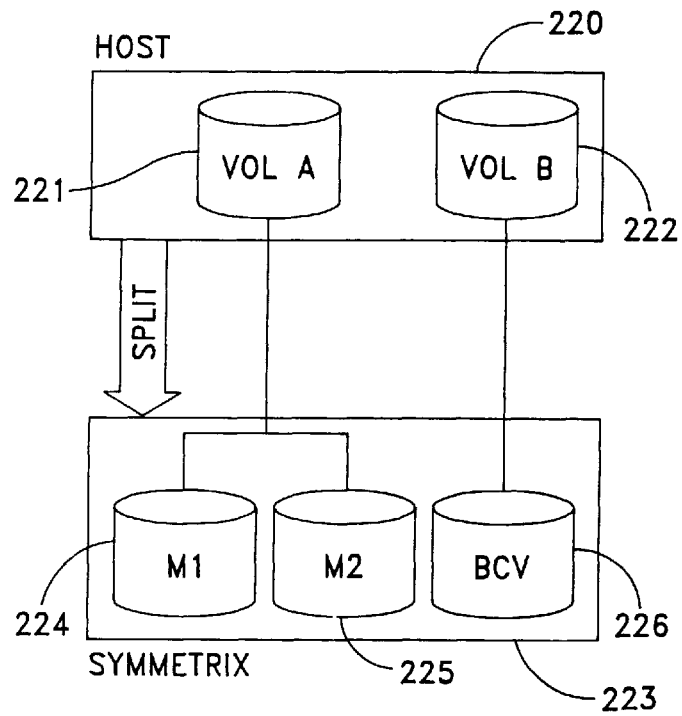
FIG. 13 depicts the system of FIG. 9 after splitting and reconnecting the BCV device to a host.

Step 260 manages any write pending operations to the BCV device 226. There are four possible situations. For the first situation and in the context of FIG. 13, if there are no write pending operations for either the BCV device 226 as a mirror or the M1 and M2 mirror devices 224 and 225, in-cache bit flags are set to 0 in the BCV device tables. For the second situation, write pending operations only involve the M1 and M2 mirror devices 224 and 225. In that situation the in-cache bit flags are set to 0 in the BCV device tables. In a third situation write pending operations involve only the BCV device 226 acting as a mirror, not the M1 and M2 mirror devices. The same write pending cache slot is maintained in a manner that is known in the art. However, the attributes of that slot are altered to reflect the device number of the BCV device 226 instead of M1 and M2 devices 224 and 225 and to reflect that the mirror is now the BCV device 226 using the current mirror identification, that is the M3 mirror in this particular example. The write pending and in-cache flags for the BCV device 226 acting as a mirror are cleared for the M1 and M2 mirror devices 224 and 225 and set for the BCV device 226.

In the fourth situation write pending requests are present on both the BCV device 226 acting as a mirror and the M1 and M2 mirror devices 224 and 225. The write pending cache slot is duplicated. The copy or duplicate of the cache slot is altered to reflect or define the device number for the BCV device 226 instead of a standard mirror device, such as the M1 and M2 mirror devices 224 and 225. The duplicate slot is also altered to reflect that the mirror is now the BCV's former first available local mirror, i.e., the M3 mirror in the example of FIGS. 9 and 13, instead of one of the M1 and M2 mirror devices 224 and 225. The write pending and in-cache flags for the BCV device 226 acting as a mirror are cleared on the M1 and M2 mirror devices 224 and 225 and set on the BCV device 226. Maintaining the BCV device 226 in a high priority write state minimizes the potential for encountering the fourth case.

Once the write pendings are handled in step 260, step 261 copies the identification (ID) tables from the M1 and M2 mirror devices 224 and 225 to the BCV device 226. However, the M4 track bit position is cleared of all invalid values. When the BCV device 226 acts as other than a single mirror, this action automatically propagates the data to any additional mirror devices.

Step 262 then sets the BCV device 226 to a ready.state with respect to the Volume B application 222. In step 263 the device controller posts a complete status as a return message. The host adapter, in step 264, receives that status and reconnects. When this occurs, the Volume B application 222 now accesses the data set as it stood at the instant of the SPLIT command. The processing of this data then occurs in parallel with or concurrently with the processing of the Volume A application 221, but on the replicated copy of the data set.

As the Volume A application 221 thereafter alters tracks on the M1 and M2 mirror devices, it marks the corresponding track bit positions to a valid state for the M1 and M2 mirror devices 224 and 225. It also sets to an invalid state the bit positions for the M3 mirror constituted by the disconnected BCV device 226.

Similarly, as the Volume B application 222 alters data on the BCV device 226, it will set the M1 bit position for the corresponding tracks to a valid state and an M4 bit position as indicating that the data on the M1 and M2 mirror devices 224 and 225 has not been updated. In the embodiment of this invention using BCV devices, the track status block for the BCV device 226 uses only two bit positions. The M1 bit position identifies the status of the tracks on the BCV device 226; the M4 bit position represents the other devices in the storage unit 223, in FIG. 13, the M1 and M2 mirror devices 224 and 225. The M2 and M3 bit positions are not used.

More specifically, prior to the processing of the SPLIT command and assuming synchronization, the invalid track counts and status are given by:

TABLE 1

|  | M1 | M2 | M3 | M4 |
| --- | --- | --- | --- | --- |
| M1 AND M2 MIRROR DEVICES 224 AND 225 | 0 READY | 0 READY | 0 READY | MAX NOT ACTIVE |
| BCV DEVICE 226 | 0 NR | MAX NOT ACTIVE | MAX NOT ACTIVE | 0 NOT ACTIVE |

In Table 1, MAX represents the maximum number of tracks for each device. The combination of the 0 count and Not Ready (NR) state of the M1 position indicates that while the BCV device 226 has current data, it is not available to the Volume B application 222.

Immediately after processing the SPLIT command, the device controller for the BCV device 226 makes it available to the Volume B application 222 and isolates it from the M1 and M2 mirror devices 224 and 225. At that point the invalid track counts and ready states are:

TABLE 2

|  | M1 | M2 | M3 | M4 |
| --- | --- | --- | --- | --- |
| M1 AND M2 MIRROR DEVICES 224 AND 225 | 0 READY | 0 READY | 0 NR | MAX NOT ACTIVE |
| BCV DEVICE 226 | 0 READY | MAX NOT ACTIVE | MAX NOT ACTIVE | 0 NOT ACTIVE |

Thereafter and assuming that the Volume A application 221 alters data in 465 tracks of the M1 and M2 mirror devices 224 and 225 and the Volume B application 222 alters data in 125 tracks of the BCV device 226, the track counts and status are:

TABLE 3

|  | M1 | M2 | M3 | M4 |
| --- | --- | --- | --- | --- |
| M1 AND M2 MIRROR DEVICES 224 AND 225 | 0 READY | 0 READY | 465 NR | MAX NOT ACTIVE |
| BCV DEVICE 226 | 0 READY | MAX NOT ACTIVE | MAX NOT ACTIVE | 125 NOT ACTIVE |

In effect these tables demonstrate that the system monitors the changes to data in each copy of the data set in the M1 and M2 mirror devices 224 and 225 as a first or primary data storage facility and in the BCV device 226 as a second or secondary data storage facility.

RE-ESTABLISH Command

Once the processing of data in the BCV device 226 by an application, such as the Volume B application 222, has been completed, it is possible to reconnect the BCV device 226 as a mirror for the volume which has just been analyzed or as a mirror to an entirely new volume. If the decision is to mirror a new volume, then the foregoing configuration procedure and ESTABLISH command are issued. If, however, it is desired to reestablish the mirror function with the previously mirrored system, then a RE-ESTABLISH command is issued. In response the BCV device 226 is isolated from the Volume B application 222 and reconnects as a mirror to the M1 and M2 mirrors 224 and 225. Now, however, it will be necessary to overwrite tracks on the BCV device 226 with data from the M1 and M2 mirror devices 224 and 225 that has been altered in those devices by the Volume A application 221 and in the BCV device 226 by the Volume B application 222. Consequently the only tracks that need to be updated in the BCV device 226 to synchronize the BCV device 226 as the M3 mirror are represented by the merge of those altered tracks. In the specific example shown in Table 3, the maximum number of tracks will be 465 tracks plus 125 tracks (i.e., 590 tracks) assuming none of the tracks is a duplicate.

Figure 16:
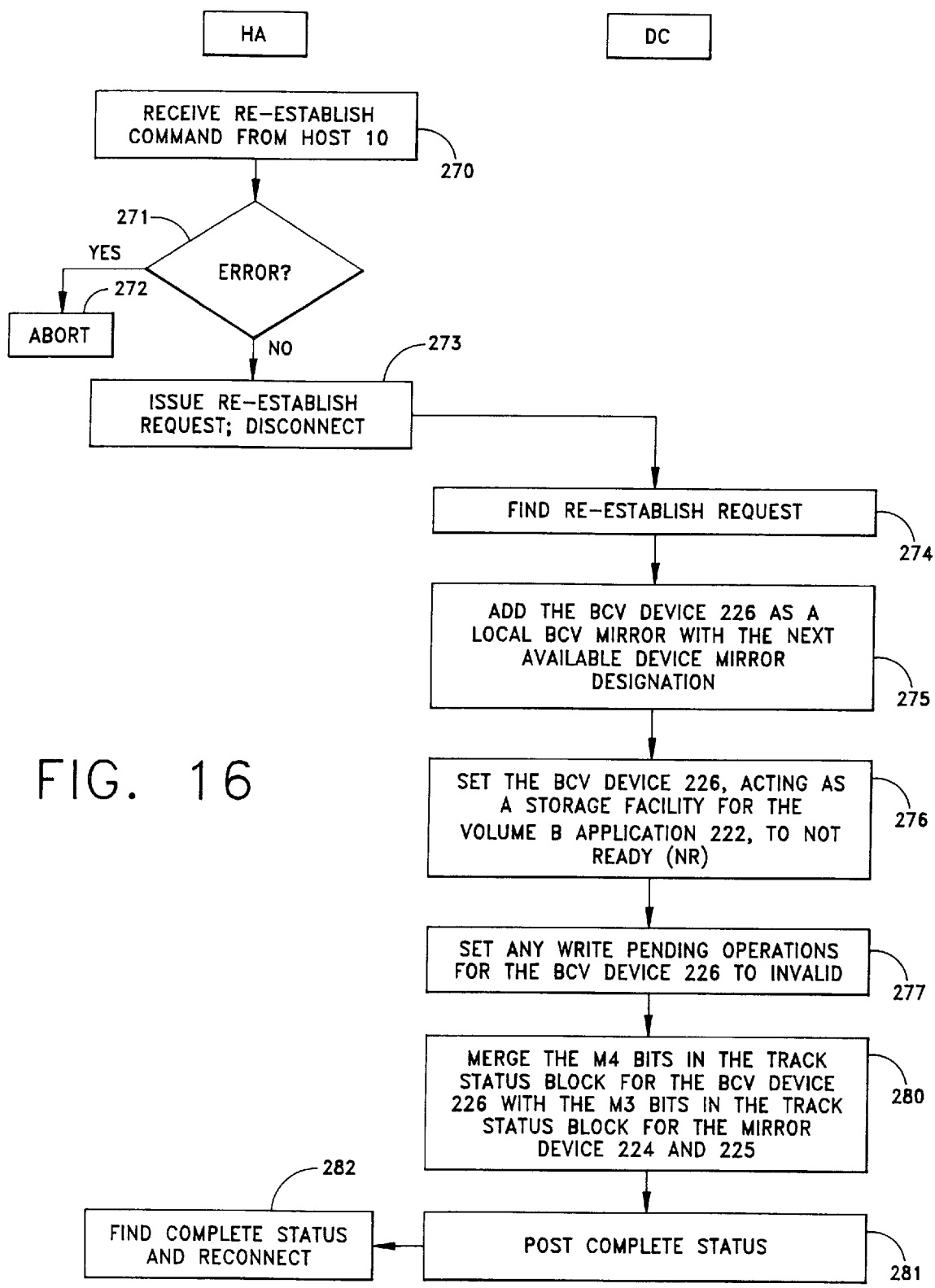
FIG. 16 depicts the procedure for establishing the connection shown in FIG. 15.

FIG. 16 depicts the procedure followed by the host adapter and device controller in response to the RE-ESTABLISH command. As in the previous cases, the host adapter receives the RE-ESTABLISH command from the host in step 270 and tests for errors in step 271. If an error is found, step 272 aborts the process and issues an appropriate error code. One such error occurs if the designated BCV device is not the device that initiated the ESTABLISH command. Assuming no errors exist, step 273 issues a reestablish request to the device controller and then disconnects in a manner analogous to the disconnection in FIG. 12.

Figure 15:
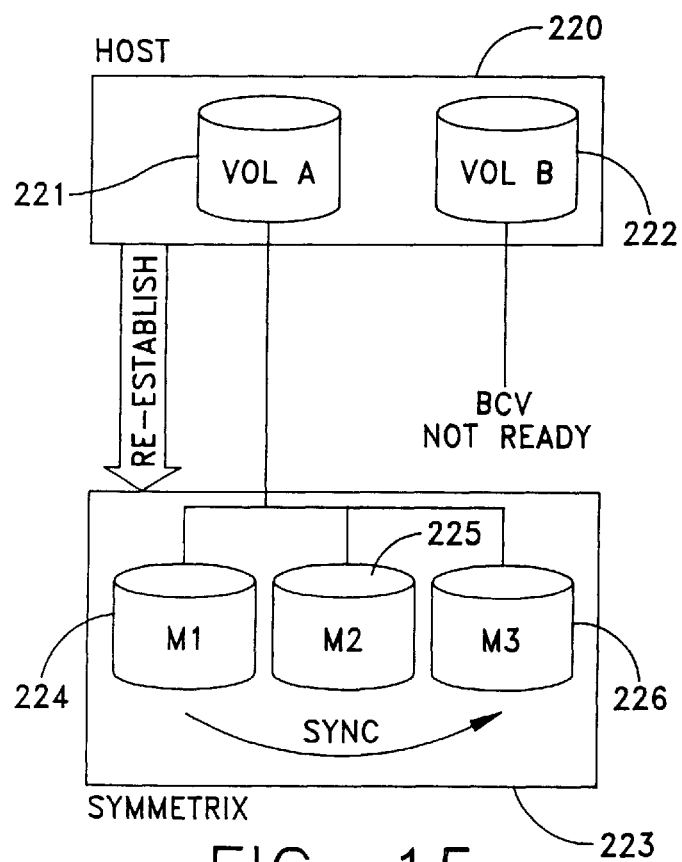
FIG. 15 depicts the system in FIG. 9 after reestablishing the BCV device as a mirror.

The device controller, in step 274, receives the reestablish request and adds the BCV device 226 as the next available standard device mirror in step 275. The BCV device 226 is indicated to be Not Ready (NR) to the Volume B application 222 in step 276. All write pendings to the BCV device are set to be invalid in step 277. Step 280 in FIG. 16 merges the BCV device track M 4 and the BCV mirror invalid tracks. In the specific example of FIG. 15, the M3 bit positions in the track status block for the mirror devices M1 and M2 define the invalid blocks. This merger identifies only those tracks that need to be updated or refreshed to minimize the number of transfers needed to reestablish synchronism. Further, in the particular example shown, if a BCV device M4 bit position is invalid or the standard device BCV mirror track is invalid (i.e., the M3 bit position in this example), the M3 BCV mirror track is set to be invalid. Thus if the Volume B application 222 modifies the data in any track, that track will be rewritten in subsequent to the execution of the RE-ESTABLISH command as will any track written by the Volume A application 221. Once the merge has been complete, step 281 completes posting various status information as previously indicated and transfers that status in step 282 to the host adapter thereby to reestablish a connection with the host adapter.

In the specific example depicted above, assume that the RE-ESTABLISH command issues at the time the status is as shown in Table 3 (i.e., the Volume A application 221 altered 465 tracks and the Volume B application 222 altered 125 tracks). Once the RE-ESTABLISH command has been executed, the track count values and status will be as follows:

TABLE 4

|  | M1 | M2 | M3 | M4 |
| --- | --- | --- | --- | --- |
| M1 AND M2 MIRROR DEVICES 224 AND 225 | 0 READY | 0 READY | 590 READY | MAX NOT ACTIVE |
| BCV DEVICE 226 | 0 NR | MAX NOT ACTIVE | MAX NOT ACTIVE | 0 NOT ACTIVE |

Once the BCV device 226 has been brought into synchronism, the track count values and status are as follows:

TABLE 5

|  | M1 | M2 | M3 | M4 |
| --- | --- | --- | --- | --- |
| M1 AND M2 MIRROR DEVICES 224 AND 225 | 0 READY | 0 READY | 0 READY | MAX NOT ACTIVE |
| BCV DEVICE 226 | 0 NR | MAX NOT ACTIVE | MAX NOT ACTIVE | 0 NOT ACTIVE |

Thus the RE-ESTABLISH command is useful when the BCV device 226 is to be reconnected as a mirror to the previously connected data storage system. The RE-ESTABLISH command can thus reduce the time required to achieve resynchronization over the time that would be required if the ESTABLISH command were run again.

The RESTORE Command

The RESTORE command restores all the data on the BCV device 226 to the mirror devices 224 and 225. This procedure is useful if a failure occurs in the M1 and M2 mirror devices 224 and 225 while the BCV device 226 has a valid copy. For example, if the Volume B application 222 were a backup operation, no data would change in the BCV device 226. If a disk failure or file corruption event were to occur so the data sets in both the M1 and M2 mirror devices 224 and 225 were invalid, the RESTORE command could then restore the data in the M1 and M2 mirror devices 224 and 225 in the version that existed at the time of the prior SPLIT command from the BCV device 226.

Figure 17:
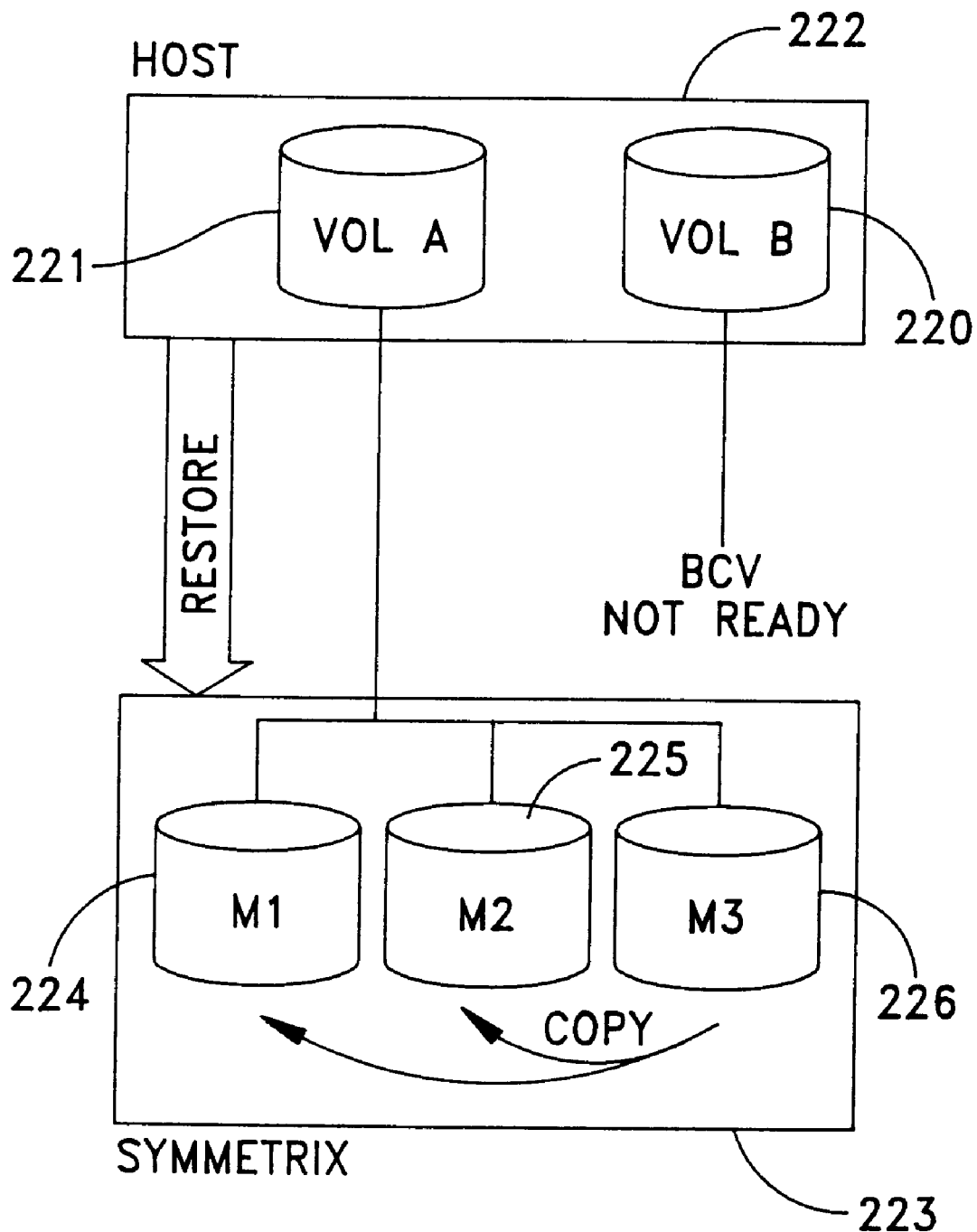
FIG. 17 depicts the system in FIG. 9 during a restoration of data from the BCV device operating as a mirror.
Figure 18:
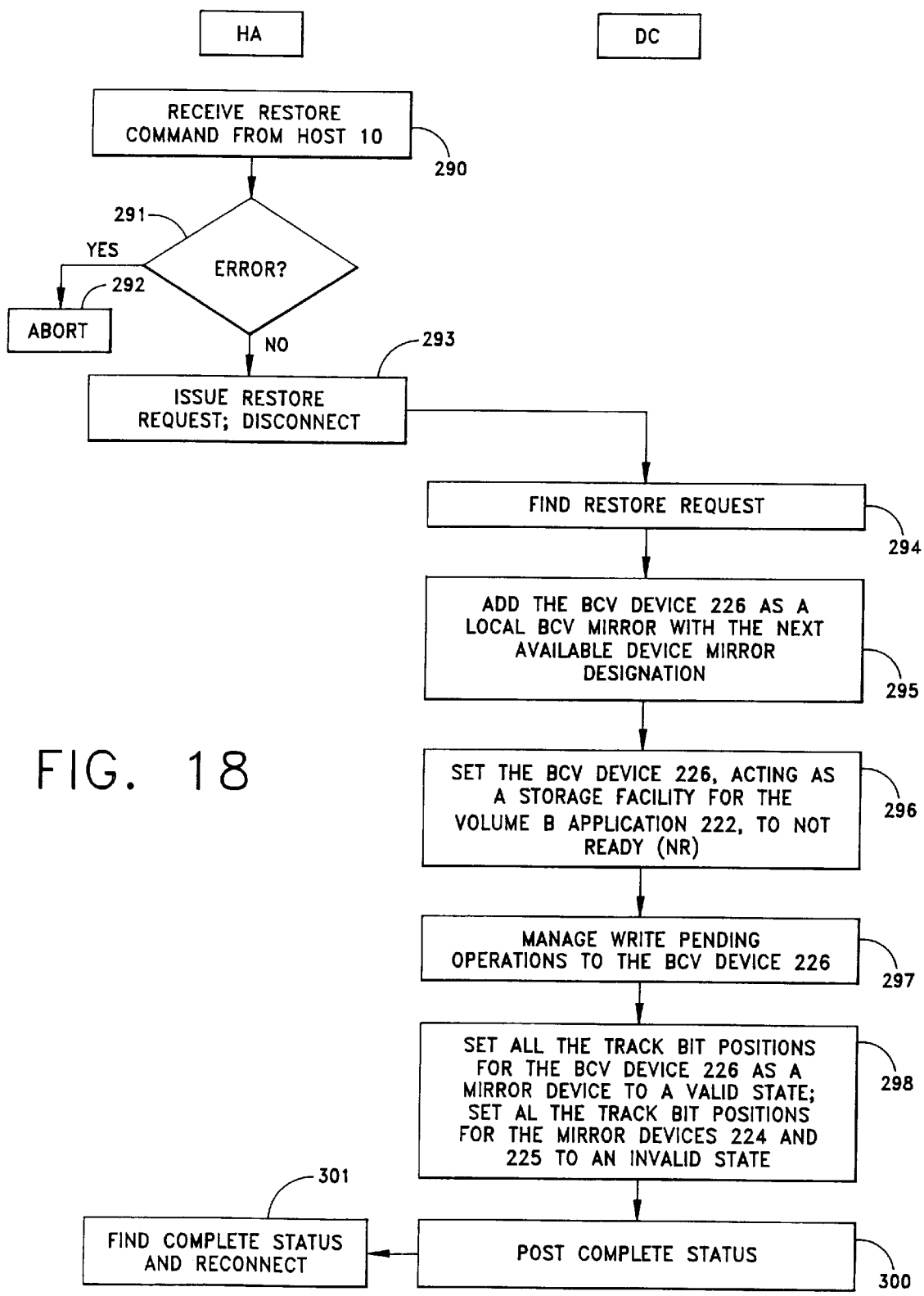
FIG. 18 depicts a first procedure for establishing the connection shown in FIG. 17.

In response to the RESTORE command, the BCV device 226 is isolated from the Volume B application 222, as shown in FIG. 17. As shown in FIG. 18, the host adapter receives a RESTORE command in step 290 and tests for error conditions in step 291. An error condition, unique to the RESTORE command, exists if the BCV device 226 has invalid tracks, if there are write pending operations to the M1 and M2 mirror devices 224 and 225 or if the M1 and M2 mirror devices 224 and 225 have a Not Ready (NR) status. Step 292 aborts any processing of the RESTORE command if any error conditions exist.

If no errors exist, step 291 diverts to step 293 that issues a restore request and then disconnects. When the device controller encounters the restore request in step 294, it selects the next available standard mirror device, the M3 mirror device in this particular example, in step 295. Step 296 isolates the BCV device 226 from the Volume B application 222 by indicating the device is no longer ready or available to the Volume B application 222.

Various pending write operations are managed in step 297. As previously indicated, one of the error conditions tested in step 291 is the presence of pending write operations for the M1 and M2 mirror devices 224 and 225. Thus, step 297 only encounters other write pending operations for transfers to the BCV mirror device. If any exist, the same write pending cache slot is maintained, but its attributes are altered to reflect the device number of the standard device instead of the BCV device 226 and to reflect that the mirror is now one of the M2, M3 and M4 mirror devices instead of the first available local mirror of the BCV device 226. The write pending and in-cache flags for the BCV M1 track status bits are cleared but set on the BCV mirror as a mirror for the M1 and M2 mirror devices 224 and 225. Thus in this particular example, the M2 bits associated with the BCV device would be cleared while the M3 bits in the track status register for the M1 device would be set for those tracks corresponding to pending write operations.

As the initiation of the RESTORE command assumes that only the BCV device 226 contains valid data, the device controller in step 298 sets all the BCV mirror tracks, the M3 mirror tracks in this specific example, to valid states and sets all the M1 and M2 mirror device tracks to an invalid state. Once this operation is complete, the status is posted in step 300 and the system returns to normal operation in step 301 whereupon the copy program begins the transfer of data from the BCV device 226 to the M1 and M2 mirror devices 224 and 225.

An example of how these bits are set can be more readily ascertained by reviewing the various states of the track counts and status associated with each of the M1 and M2 mirror devices 224 and 225 and the BCV device 226 assuming the decision to issue a RESTORE command is made at the time depicted in Table 3.

In response to the RESTORE command, the BCV device 226 is no longer available to the Volume B application 222 but is available as a mirror as it contains a coherent copy of the data. The invalid track counts for the M1 and M2 mirror devices 224 and 225 contain values corresponding to the maximum number of invalid tracks in view of the operation of step 298. This number immediately starts to decrease when the full copy operation is triggered.

TABLE 6

| | M1 | M2 | M3 | M4 |
|---|---|---|---|---|
| M1 AND M2 MIRROR DEVICES 224 AND 225 | MAX READY | MAX READY | 0 READY | MAX NOT ACTIVE |
| BCV DEVICE 226 | 0 NR | MAX NOT ACTIVE | MAX NOT ACTIVE | 125 NOT ACTIVE |

Once the standard devices M1 and M2 devices 224 and 225 receive full copies from the BCV device 226 acting as the mirror M3, their invalid track counts reduce to zero (0) so they now are valid mirrors. At this point the M1 through M4 tracks are as follows:

TABLE 7

| | M1 | M2 | M3 | M4 |
|---|---|---|---|---|
| M1 AND M2 MIRROR DEVICES 224 AND 225 | 0 READY | 0 READY | 0 READY | MAX NOT ACTIVE |
| BCV DEVICE 226 | 0 NR | MAX NOT ACTIVE | MAX NOT ACTIVE | 125 NOT ACTIVE |

INCREMENTAL RESTORE Command

As will be apparent, if the Volume B application alters any tracks in the BCV device 226, the RESTORE command will overwrite this new or altered data onto the M1 and M2 mirror devices 224 and 225. Such a restoration might be appropriate when the Volume B application 222 acts to produce a desired alteration of a data base and the altered data base is to replace the original data base.

Figure 19:
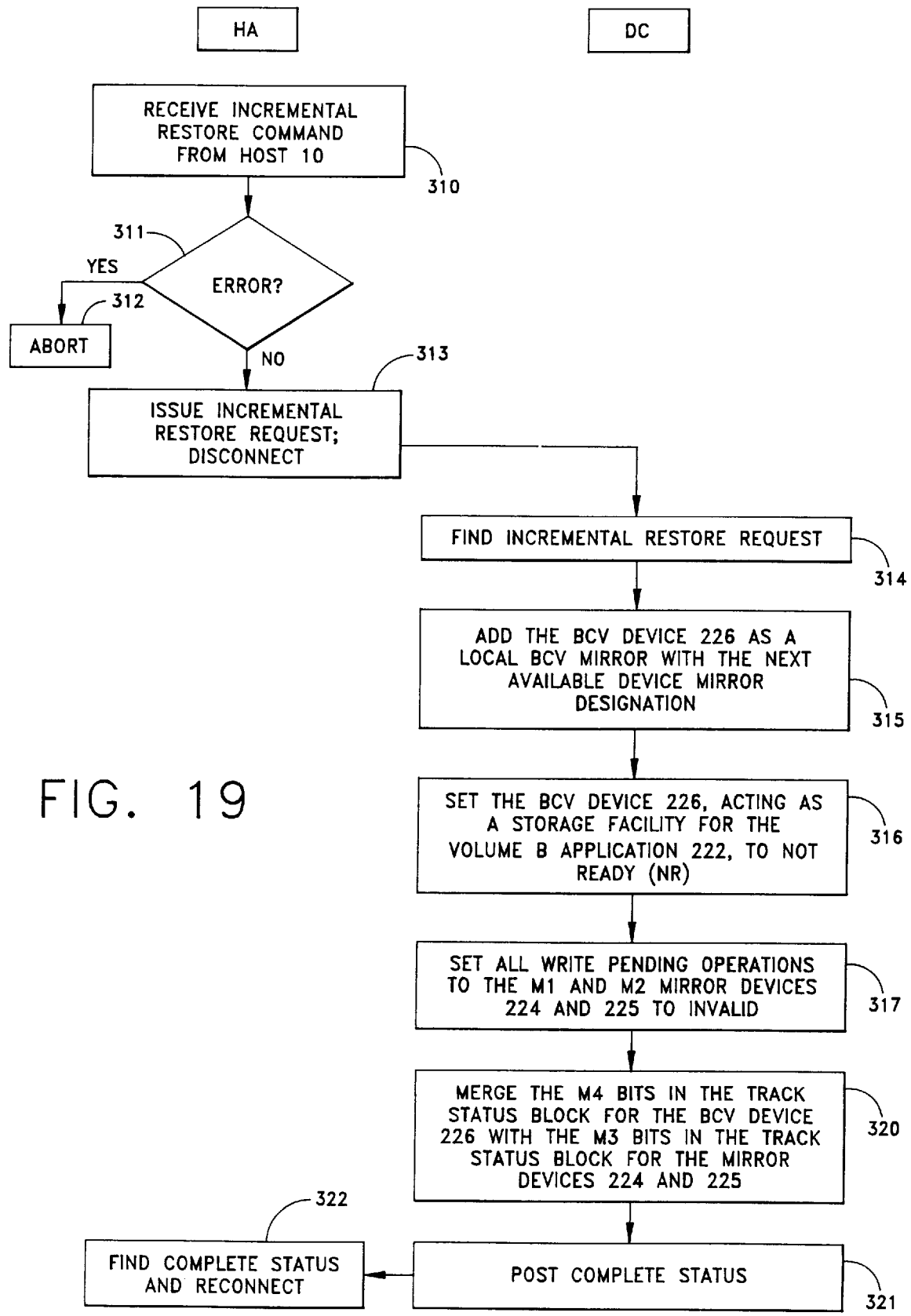
FIG. 19 depicts a second procedure for establishing the connection in FIG. 17.

An alternative INCREMENTAL RESTORE command brings the M1 and M2 mirror devices 224 and 225 into synchronism with the BCV device by transferring only data from tracks that the Volume A application has altered since a SPLIT command. This establishes synchronization without the costly overhead of performing a full restoration. FIG. 19 depicts the process whereby steps 310 through 313 represent the steps for issuing an incremental restore request to the device controller in response to the receipt of the INCREMENTAL RESTORE command from the host. The device controller responds by finding the incremental restore request in step 314. In step 315 the process adds the local BCV device 226 as the next available standard device mirror, the M3 mirror in this specific example. In step 316 the BCV device 226 is isolated from the Volume B application 222 by establishing an NR state for that application. All standard device write pending operations are then set to be invalid to terminate any further writing operations to the M1 and M2 mirror devices 224 and 225.

In the same manner as described with respect to step 280 in FIG. 16, step 320 merges the BCV device and BCV mirror invalid tracks as represented by the M3 track status bits for the M1 and M2 mirror devices 224 and 225 and the M4 track status bits for the BCV device 226. The merged data represents the total number of altered tracks that require restoration. This merged data is transferred to the M1 and M2 mirror device track status bits. Once this process is completed, steps 321 and 322 terminate the operations as previously indicated. Then the copy program can transfer the incremental number of tracks back to the M1 and M2 devices in this specific example.

An example of this response can be better understood by referring to a specific example again using Table 3 as a starting point.

As previously indicated, at the instant the INCREMENTAL RESTORE command is processed, 465 tracks of the M1 and M2 mirror devices 224 and 225 have been written by the Volume A application 221 and 125 tracks rewritten in the BCV device 226 by the Volume B application 222. After the device controller executes the INCREMENTAL RESTORE command, the BCV device 226 is no longer ready with respect to the applications program in the A volume 221. However in the context of its status as a BCV mirror, i.e., as the M3 mirror device, it contains a coherent copy of the data. When the operation is complete, the M1 and M2 track status bits contain the intersection of the invalid tracks from the BCV device 226. More specifically, after the INCREMENTAL RESTORE command the track counts are:

TABLE 8

|  | M1 | M2 | M3 | M4 |
|---|---|---|---|---|
| M1 AND M2 MIRROR DEVICES 224 AND 225 | 590 READY | 590 READY | 0 READY | MAX NOT ACTIVE |
| BCV DEVICE 226 | 0 NR | MAX NOT ACTIVE | MAX NOT ACTIVE | 125 NOT ACTIVE |

Once the standard M1 and M2 mirror devices 224 and 225 are synchronized, the track counts appear as follows:

TABLE 9

|  | M1 | M2 | M3 | M4 |
|---|---|---|---|---|
| M1 AND M2 MIRROR DEVICES 224 AND 225 | 0 READY | 0 READY | 0 READY | MAX NOT ACTIVE |
| BCV DEVICE 226 | 0 NR | MAX NOT ACTIVE | MAX NOT ACTIVE | 125 NOT ACTIVE |

Other Commands

To facilitate management and monitoring of a system such as shown in FIG. 1 that incorporates one or more BCV devices, such as the BCV device 226, it is possible to incorporate a QUERY command and a VERIFY command.

A QUERY command reports the state of all BCV devices. Each device controller responds to the QUERY command by assembling device records for each BCV device for inclusion in the data returned in response to the command. The command typically is a global command.

A VERIFY command can be useful in verifying that any particular BCV device acting as a mirror is in synchronization with the device being mirrored. Such a command would be issued with respect to a particular device by its identification such as a device number. Returned data could merely indicate the existence or nonexistence of synchronization or for more quantitative information the number of invalid tracks left to copy to the BCV device acting as a mirror, the track count in the M3 track status bit position in this specific example, or the number of invalid tracks left to be copied to the mirror devices such as the M1 and M2 mirror devices in this specific example as represented by the count as might be included in the M1 or M2 bit positions for the mirror devices such as the M1 and M2 mirror devices 224 and 225.

BCV Device With Local And Remote Systems

Figure 20:
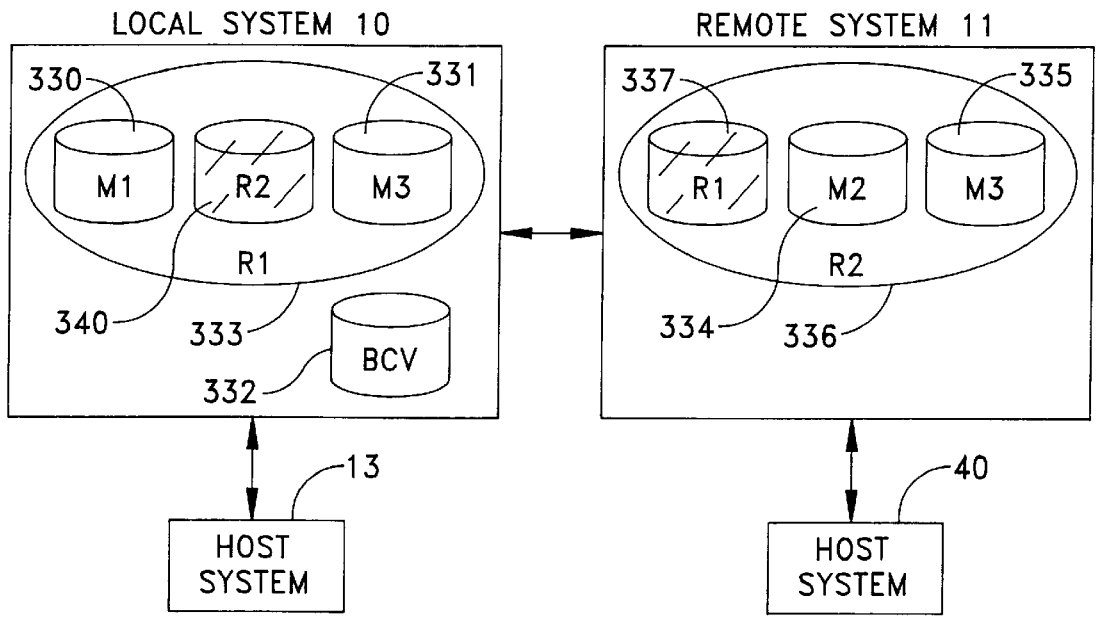
FIG. 20 depicts another embodiment of this invention incorporating a BCV device with a local and remote system of FIG. 1.

Using the same basic approach as shown in FIG. 9 and related figures, a data processing network including a local system 10 and remote system 11 can be represented as shown in FIG. 20 with a host system 13 and a host system 40. The local system 10 includes two mirror memory devices identified as M1 and M3 mirror device 330 and 331. As previously indicated, these mirrors might be connected to the device controllers 20 and 21 in FIG. 1, respectively. An additional BCV volume 332 is also associated with the local system 10 and would be tied to a third device controller, not shown in FIG. 1. The M1 and M3 mirror devices represent a source device R1 designated by reference numeral 333.

At the remote system, a data storage facility includes M2 and M3 mirror devices 334 and 335, respectively, that could attach to device controllers such as device controllers 46 and 47 in FIG. 1. These memory devices constitute a target or R2 memory device represented by reference numeral 336 that acts as a remote mirror. As will be apparent, in this configuration there are local and remote mirrors. Each mirror has an assigned specific number, e.g., 1, 2, 3 . . . Local and remote mirrors are designated by the use of "M" and "R" respectively. In accordance with the prior description of FIGS. 1 through 7, a virtual memory device R1 represented by reference numeral 337 in the target R2 device 336 is a remote mirror representing the entire source R1 device represented by reference numeral 333. Similarly an R2 mirror device 340 is a virtual memory that is a mirror representing the entire target R2 device 336. Thus if a change is made to the source R1 device 333, the change is made to both the M1 and M3 mirror devices 330 and 331 and the change is transferred to the remote system 11 to be made on the M2 and M3 mirror memory devices 334 and 335.

If either of the foregoing ESTABLISH or RE-ESTABLISH commands are generated by the host system 13, the procedures set forth in FIGS. 12 and 14 establish the BCV device 332 as another mirror device for the source R1 device 333 and will synchronize with the M1 and M3 mirror devices 330 and 331. If a problem exists that prevents such a transfer, it is possible to obtain a remote copy from the target R2 device. Similarly in the configuration shown in FIG. 20, the SPLIT command operates as shown in FIG. 14 to enable the BCV device 332 to respond to another application such as the Volume B application 222 in FIG. 9.

If the host system 13 generates a RESTORE or INCREMENTAL RESTORE command, the response of the system will depend upon the status of communications between the local system 10 and the remote system 11. More specifically, it is possible for some applications, unrelated to either the Volume A application 221 or Volume B application 222 in FIG. 9 to suspend mirroring between the local system 10 and the remote system 11. If mirroring is not suspended, the RESTORE or INCREMENTAL RESTORE command produces local transfers to cause the mirrors M1 and M3 to be brought into synchronization with the BCV device 332 as previously described. This will cause the track status bits corresponding to the R2 virtual memory for the remote system 11 to be set to an invalid state and begin copying the altered tracks to the remote system target R2 device 336. Thus the local and remote systems 10 and 11 will come into synchronization. If a nonrelated procedure has suspended mirroring, the response to the RESTORE command or INCREMENTAL RESTORE command is only local. That is, operations as previously described will bring the M1 and M3 memory devices 330 and 331 into synchronism with the BCV device 332. Synchronism between the local system 10 and remote system 11 will then be delayed until mirroring is re-established.

Figure 21:
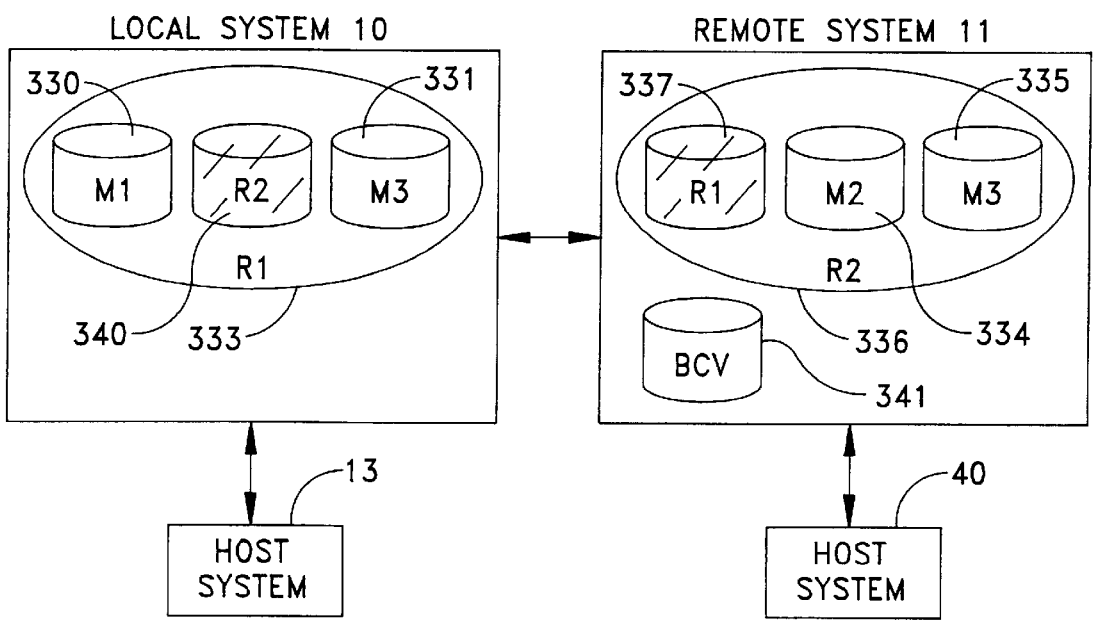
FIG. 21 depicts another embodiment of this invention incorporating a BCV device with a local and remote system shown in FIG. 1.

FIG. 21 depicts another alternative wherein the BCV device 332 of FIG. 20 is eliminated and a BCV device 341 is configured in the remote system 11. The response to the ESTABLISH and RE-ESTABLISH commands is as previously described with the synchronization being produced by transfers from one of the mirror devices 334 or 335 if they are operating properly in synchronism with the local system 10.

In this configuration it is possible for multiple sources to be seeking access to the resources in the target R2 device 334 and to the remote system 11. Consequently conventional steps are taken in response to the SPLIT command to invoke necessary locking operations to prevent any contention by another source to the remote system 11. This includes suspending communications between the local system 10 and remote system 11 while the SPLIT command is executed. Otherwise, the SPLIT command is executed as previously described with respect to the FIGS. 13 and 14. Then the BCV device 341 becomes accessible to an application analogous to the Volume B application 222 in FIG. 9. After the SPLIT command is executed, communications are re-established between the local system 10 and the remote system 11. At that point if any alterations have occurred in the local system 10, the changes will propagate to the M2 and M3 mirror devices 334 and 335 as previously described with reference to FIGS. 1 through 7. At this point the BCV device 341 contains an instant copy of the data in the target R2 source 336 and is available for concurrent processing by the application in the host system 40.

The response of a system in FIG. 21 to the RESTORE or INCREMENTAL RESTORE commands is somewhat analogous to the response to the commands when the BCV device is located in the local system as shown in FIG. 20. More specifically, if mirroring between the local and remote systems 10 and 11 has not been suspended, the mirroring is suspended. In this case, however, the data transfers from the BCV device 341 to the M2 and M3 mirror devices 334 and 335. As this occurs, invalid tracks are marked on the R1 mirror 337 to enable those changes to be transferred back to the local system 10. If the data is to be restored to the local system 10, the identity of the invalid tracks is transferred to the local system 10 by marking the appropriate tracks for the M1 and M3 devices 330 and 331 to an invalid state. This will cause a transfer of data from the remote system 11 to the local system 10. Once this operation is complete, normal mirroring between the local system 10 and remote system 11 resumes, provided the suspension occurred in response to the RESTORE or INCREMENTAL RESTORE command.

An understanding of this operation can be better understood by referencing the following tables that assuming that a SPLIT command has been issued, and that the source R1 device 333 and the source R2 device 336 are in synchronism. The source R1 invalid track counts are given by:

TABLE 10

|  | M1 | R2 | M3 | M4 |
| --- | --- | --- | --- | --- |
| SOURCE (R1) DEVICE 336 | 0 READY | 0 READY | 0 READY | MAX NOT ACTIVE |

In this case the BCV device 341 is designated to be the M4 device in the remote system 11, and, as previously indicated, the M4 bit position for the BCV device 341 represents tracks that have been altered in the BCV device 341 in its non-mirroring mode.

Table 11 depicts the invalid track counts for the remote system 11. This indicates that 465 tracks have been altered as a result of operations by the host system 13 and 125 tracks have been altered by the host system 40.

TABLE 11

|  | R1 | M2 | M3 | M4 |
| --- | --- | --- | --- | --- |
| TARGET (R2) STANDARD DEVICE | 0 READY | 0 READY | 0 READY | 465 NR |
| TARGET (R2) BCV DEVICE | 0 READY | MAX NOT ACTIVE | MAX NOT ACTIVE | 125 NOT ACTIVE |

When the device controller responds to the RESTORE command, the BCV device 341 is no longer available to the host system 40, that is, it assumes a Not Ready (NR) state with respect to the host system 40. However as a mirror, it contains the coherent copy of the data. In response to a RESTORE command, then, data transfers from the BCV device 341 acting as a mirror to the M2 and M3 mirror devices 334 and 335. The target R2 source 336 also operates to maintain a record of the invalid tracks to be used for the remote restore. The local system 10 is not changed by this operation. Once the local restore has been changed, Table 12 depicts the invalid track counts and status:

TABLE 12

|  | R1 | M2 | M3 | M4 |
| --- | --- | --- | --- | --- |
| TARGET (R2) STANDARD DEVICE | MAX READY | MAX READY | MAX READY | 0 READY |
| TARGET (R2) BCV DEVICE | 0 READY | MAX NOT ACTIVE | MAX NOT ACTIVE | 125 NOT ACTIVE |

Once the M2 and M3 mirror devices 334 and 335 are in synchronism, the table and track counts will appear as follows:

TABLE 13

|  | R1 | M2 | M3 | M4 |
| --- | --- | --- | --- | --- |
| TARGET (R2) STANDARD DEVICE | MAX READY | 0 READY | 0 READY | 0 READY |
| TARGET (R2) BCV DEVICE | 0 NR | MAX NOT ACTIVE | MAX NOT ACTIVE | 125 NOT ACTIVE |

Data in Table 13 indicates that the M2 and M3 mirror devices 334 and 335 are in synchronism with the BCV device 341 but that the source R1 device 333 is not in synchronism. If it is necessary to restore this data to the source R1 device 333, operations with the host system 13 must be terminated temporarily. The invalid track information is then propagated to the local system 10 to the M1 and M3 mirror devices 330 and 331. Immediately after this occurs, the invalid track counts and status for the source R1 device 331 are as follows:

TABLE 14

|  | M1 | R2 | M3 | M4 |
| --- | --- | --- | --- | --- |
| SOURCE (R1) STANDARD DEVICE | MAX READY | 0 READY | MAX READY | MAX READY |

Immediately upon receiving this updated information, the M1 and M3 counts begin to decrease. In this case the M4 count does not decrease because it does not correspond to any device. Once the M1 and M3 memory devices 330 and 331 receive full copies of the data, their invalid track count reduces to zero (0) and they are now valid mirrors. Moreover at this point Table 15 depicts the invalid track counts and status associated with the local system 10 and Table 16 depicts the track counts and status associated with the remote system 11.

TABLE 15

|  | M1 | R2 | M3 | M4 |
|---|---|---|---|---|
| SOURCE (R1) STANDARD DEVICE | 0 READY | 0 READY | 0 READY | MAX NOT ACTIVE |

TABLE 16

|  | R1 | M2 | M3 | M4 |
|---|---|---|---|---|
| TARGET (R2) STANDARD DEVICE | 0 READY | 0 READY | 0 READY | 0 READY |
| TARGET (R2) BCV DEVICE | 0 NR | MAX NOT ACTIVE | MAX NOT ACTIVE | 125 NOT ACTIVE |

Figures 22, 23:
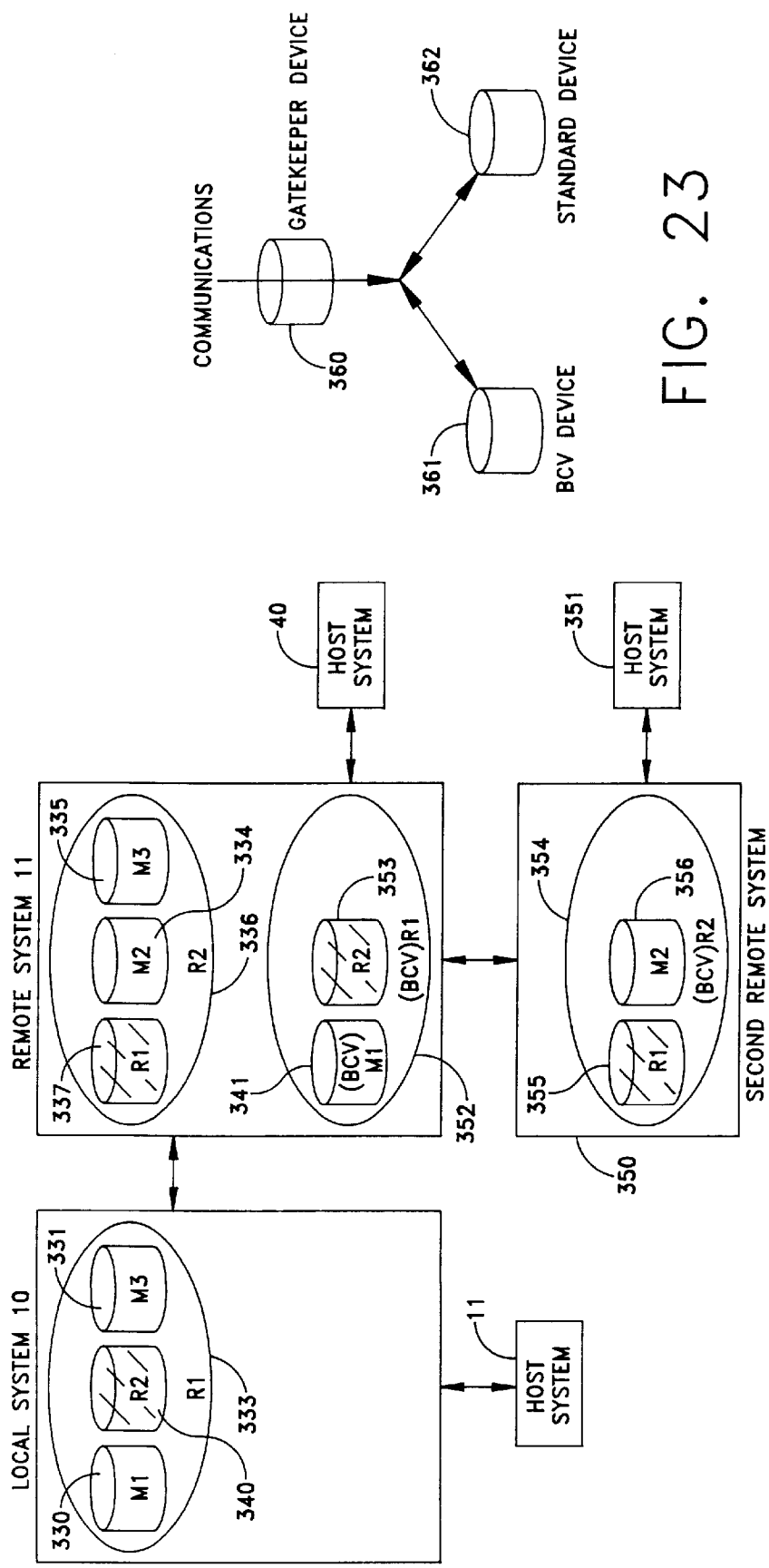
FIG. 22 depicts another embodiment of this invention in the context of a local system and remote system of FIG. 1.
FIG. 23 depicts the system of FIG. 9 in combination with a gatekeeping device.

FIG. 22 further illustrates the power and flexibility of networks using BCV devices by depicting a configuration that facilitates the transfer of data from a local system 10 through a remote system 11 to a second remote system 350. In this particular example the local system 10 and remote system 11 are based upon the configuration shown in FIG. 21. In FIG. 22 the second remote system 350 attaches to the remote system 11 and to a host 351. In the remote system 11 the BCV device 341 is designated as a BCV-M1 device 341 that, in response to an ESTABLISH command, mirrors the data in the target R2 source 336.

In response to a SPLIT command, the BCV-M1 device 341 becomes an M1 mirror in a (BCV)R1 source 352 located in the remote system 11. The (BCV)R1 source also includes a virtual (BCV)R2 virtual mirror device 353. The virtual (BCV)R2 mirror then mirrors the data to a (BCV)R2 storage facility that includes a virtual (BCV)R1 mirror device 355 and a physical disk drive acting as an M2 mirror device 356.

Consequently, in response to the SPLIT command, the data in the BCV-M1 device transfers to the virtual (BCV)R2 mirror device 353 that produces a transfer to the M2 mirror device 356. Thus, the use of the BCV-M1 device 341 in this configuration enables the transfer of data from the local system 10 to the second remote system 350. Conversely, the RESTORE and INCREMENTAL RESTORE commands can be used to transfer a data set, or selected portions thereof, from the M2 mirror device 356 in the second remote system to the local system 10.

GateKeeper Devices

Each of the foregoing embodiments depicts a direct connection between a device controller, such as the device controllers 20, 21, 46 and 47 in FIG. 1, and corresponding storage devices operating either as conventional storage devices or mirrors or BCV devices. FIG. 23 depicts another alternative in which a gatekeeper device 360 is interposed between each device controller and its respective disks that contain BCV and standard volumes 361 and 362 respectively. Gatekeeper devices 360 act as sockets through which all communications between standard and BCV devices pass. Operations through the gatekeeper are not forced to be serial. Once received the systems can be polled at a later date.

If a gatekeeper device 360 is incorporated in connection with a BCV device, then a minor modification in each of the procedures set forth in FIGS. 12, 14, 16, 18 and 19 is made. As this change is the same in all, reference is particularly made to FIG. 12. As described in FIG. 12, if no error is detected in step 241, the host adapter issues an establish request in step 243 and then disconnects to await completion of the steps 244 through 249. If a gatekeeper device is used, the process transfers directly from step 241 to step 244 if no errors are detected. The host adapter will be enabled to continue with normal operations when the host adapter issues a return code. The use of such gate keeper devices 360 is known in the art and further discussion does not seem required.

This invention has been disclosed in terms of an embodiment based upon the architecture of the assignees Symmetrix data facilities. Specific implementations are therefore system specific. Discussion of other particular implementations have not been incorporated. Rather the discussion has been directed to how these different systems interact for implementing the multiple access concept of this invention and provide sufficient information for enabling an implementation on the data processing systems of other manufacturers.

In summary, each of the embodiments shown in FIGS. 1 through 7, 8 through 19 and 20 through 22 provide a data processing system that enables concurrent access to a common data set by first and second applications. In each a first data storage facility normally stores the data set. In the context of FIGS. 1 through 7 this first data storage facility comprises storage devices 15 and 16; in the context of FIG. 9, the M1 and M2 mirror devices 224 and 225; in the context of FIG. 20, the M1 and M3 devices 330 and 331. Each includes a second data storage facility that corresponds to the first data storage facility as constituted by the storage devices 42 and 43 in FIG. 1, the BCV device 226 in FIG. 9 and the BCV devices 332 and 341 in FIGS. 20 through 22. In each, in response to a command, the second data storage facility acts as a mirror for the first data storage facility. In each it is possible to terminate this mirroring function to enable a second application to access a copy of the data set. Thus in FIG. 1 concurrent access from the host systems 13 and 40 is possible. In FIG. 9 concurrent access by the Volume A and Volume B applications 221 and 22 is possible. In FIGS. 20 and 21 concurrent access from the host systems 13 and 40 is possible.

Each embodiment includes provisions for reestablishing synchronism between the first and second data storage facility. In each this is performed by monitoring track status that identifies tracks that have been altered. Thus in each of these specific embodiments, both redundancy and concurrent access are provided.

It will be apparent that a number of variations and modifications can be made to the specifically disclosed embodiments while still attaining results corresponding to those attained in those specific embodiments. For example, each of the embodiments is discussed in terms of logical volumes. The invention is readily adapted to use with physical volumes or physical disks. The invention has been described in terms of mirroring for redundancy. As previously indicated, it is possible for any of the mirror devices to actually comprise multiple physical disks for instituting sophisticated redundancy systems such as RAID 5 systems. Particular sequences of procedures or steps have been disclosed for implementing various procedures. Alternate procedures for attaining the same results could also be substituted for those specifically disclosed procedures.

Therefore, it is the intent of the appended claims to cover all such variations and modifications as come within the true spirit and scope of this invention.

What is claimed as new and desired to be secured by Letters Patent of the United States is:

1. A method for controlling access to a data set by first and second applications wherein the data set is stored in a first data storage facility that is addressable by the first application, said method comprising the steps of:

A) configuring a second data storage facility to correspond to the first data storage facility, B) establishing independently of operations in response to the first application and in response to a first command, a copy of the data set in the second data storage facility as a mirror for the first data storage facility by attaching the second data storage facility in parallel with the first data storage facility, C) in response to a second command:
  i) detaching the second data storage facility from the first data storage facility independently of operations in response to the first application thereby terminating the memory mirror function of the second data storage facility, and
  ii) attaching the second storage facility to be addressed by the second application whereby the first and second applications thereafter can access the data sets in the first and second data storage facilities respectively and concurrently, and D) in response to a third command terminating the operations in response to the second command.

2. A method as recited in claim 1 additionally comprising the steps of:

A) monitoring data set changes in the first data storage facility, and

B) monitoring data set changes in the second data storage facility.

3. A method as recited in claim 2 wherein said third command comprises the step of:

re-establishing the second data storage facility as a mirror for the first data storage facility independently of operations in response to the first application.

4. A method as recited in claim 3 wherein the first and second data storage facilities are organized into blocks that contain portions of a data set and wherein said monitoring of data set changes in the first data storage facility defines all specific blocks that have been altered, said re-establishment including the step of copying the specified blocks to overwrite corresponding blocks in the second data storage facility.

5. A method as recited in claim 2 wherein said response to the third command comprises the steps of:

i) terminating the operation of the second data storage facility in response to the second command; and ii) restoring the data from the second storage facility to the first data storage facility.

6. A method as recited in claim 5 wherein the first and second data storage facilities store data in a plurality of blocks and said monitoring of data set changes in the first data storage facility including the step of generating a status indication with respect to each data block, said restoring of data from the second data storage facility to the first data storage facility including the steps of setting the first storage facility so that said monitoring step generates invalid status indications for each data block in the first data storage facility and copying data blocks from the second data storage facility to the first data storage facility while updating the data set changes as they occur.

7. A method as recited in claim 2 wherein said response to the third command comprises the steps of:

i) terminating the operation of the second data storage facility in response to the second command; and ii) restoring selected data from the second storage facility to the first data storage facility, in response to the monitored data set changes in the second data storage facility.

8. A method as recited in claim 7 wherein the first and second data storage facilities store data in a plurality of blocks, said restoring of the data from the second data storage facility to the first data storage facility including the step of restoring blocks that said monitoring of the data set in the second data storage facility indicates were changed by the second application.

9. A method as recited in claim 1 wherein each of the first and second data storage facilities comprises first and second logical volumes on first and second disk drives, respectively, each of the disk drives connecting through a corresponding device controller to be attached to the first and second data storage facilities by producing a ready status to the first and second applications wherein said method comprises the additional steps of responding to commands by altering the ready status of the first and second logical volumes with respect to the first and second applications.

10. A method as recited in claim 1 wherein the first data storage facility comprises at least one mirror storage device and wherein the second data storage facility comprises a storage device that is responsive to data transfer requests from two locations, said response to the first command enabling a communications path for data transfer requests with the second application and inhibiting data transfer requests with the first application and said response to the second command enabling data transfer requests with the first application and disabling data transfer requests with the second application.

* * * * *